United States Patent
Lei et al.

(10) Patent No.: US 12,218,878 B2
(45) Date of Patent: *Feb. 4, 2025

(54) CODE BLOCK GROUP BASED MULTIPLEXING

(71) Applicant: QUALCOMM Incorporated, San Diego, CA (US)

(72) Inventors: Jing Lei, San Diego, CA (US); Linhai He, San Diego, CA (US); Seyong Park, San Diego, CA (US); Gabi Sarkis, San Diego, CA (US); Yi Huang, San Diego, CA (US); Renqiu Wang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,511

(22) Filed: Jul. 21, 2023

(65) Prior Publication Data
US 2023/0361970 A1 Nov. 9, 2023

Related U.S. Application Data

(63) Continuation of application No. 16/936,934, filed on Jul. 23, 2020, now Pat. No. 11,728,948.
(Continued)

(51) Int. Cl.
*H04W 72/00* (2023.01)
*H04L 5/00* (2006.01)
(Continued)

(52) U.S. Cl.
CPC .......... *H04L 5/0053* (2013.01); *H04L 5/0044* (2013.01); *H04L 27/2613* (2013.01);
(Continued)

(58) Field of Classification Search
CPC . H04W 72/0413; H04L 5/0094; H04L 5/0044
See application file for complete search history.

(56) References Cited

U.S. PATENT DOCUMENTS

| | | |
|---|---|---|
| 2018/0077685 A1 | 3/2018 | Wu et al. |
| 2018/0270705 A1 | 9/2018 | Sun et al. |

(Continued)

FOREIGN PATENT DOCUMENTS

| | | |
|---|---|---|
| EP | 2139204 A1 | 12/2009 |
| EP | 3641184 A1 | 4/2020 |

(Continued)

OTHER PUBLICATIONS

International Search Report and Written Opinion—PCT/US2020/043537—ISA/EPO—Oct. 16, 2020.
(Continued)

*Primary Examiner* — Bo Hui A Zhu
(74) *Attorney, Agent, or Firm* — Holland & Hart LLP/Qualcomm

(57) ABSTRACT

Methods, systems, and devices for wireless communications are described. A user equipment (UE) may identify a payload for inclusion in an uplink transmission. The UE may organize the payload into a code block group (CBG) that includes one or more code blocks (CB). The UE may map each CB of the CBG to a corresponding uplink shared channel resource unit (e.g., a physical uplink shared channel resource unit) of an uplink transmission occasion of the first UE. The uplink transmission occasion may also be shared with one or more additional UEs such that the CBG of the first UE is multiplexed with additional CBGs from the additional UEs. The UE may transmit, to a base station, the uplink transmission including each uplink shared channel resource unit on which the CBG is organized.

28 Claims, 18 Drawing Sheets

Related U.S. Application Data

(60) Provisional application No. 62/878,084, filed on Jul. 24, 2019.

(51) Int. Cl.
    *H04L 27/26*     (2006.01)
    *H04W 72/21*     (2023.01)
    *H04W 72/23*     (2023.01)
    *H04W 74/0833*     (2024.01)
    *H04W 76/27*     (2018.01)

(52) U.S. Cl.
    CPC ........... *H04W 72/21* (2023.01); *H04W 72/23* (2023.01); *H04W 74/0833* (2013.01); *H04W 76/27* (2018.02)

(56) References Cited

U.S. PATENT DOCUMENTS

| | | | |
|---|---|---|---|
| 2019/0380155 A1* | 12/2019 | Ren | H04L 27/2602 |
| 2020/0037385 A1* | 1/2020 | Park | H04W 56/001 |
| 2021/0022117 A1* | 1/2021 | Yi | H04L 5/0044 |
| 2021/0028905 A1 | 1/2021 | Lei | |
| 2022/0231806 A1* | 7/2022 | Hu | H04L 5/0044 |

FOREIGN PATENT DOCUMENTS

| | | |
|---|---|---|
| WO | 2018135640 A1 | 7/2018 |
| WO | WO2018175420 A1 | 9/2018 |
| WO | WO2018230289 A1 | 12/2018 |

OTHER PUBLICATIONS

LG Electronics: "Discussion on Configured Grant for NR-U", 3GPP Draft, 3GPP TSG RAN WG1 Meeting #97, R1-1906678, 3rd Generation Partnership Project (3GPP), Mobile Competence Centre, 650, Route Des Lucioles, F-06921, Sophia-Antipolis Cedex, France, vol. RAN WG1, No. Reno. USA; May 13, 2019-May 17, 2019, May 13, 2019 {May 13, 2019), XP051728129, 8 pages, sections 2.2 and 2.3.

Nokia, et al., "Code Block Segmentation of eMBB", 3GPP Draft, 3GPP TSG RAN WG1 Meeting #89, R1-1708826_CB_SEGMENTATION, 3rd Generation Partnership Project (3GPP), Mobile Competence Centre, 650, Route Des Lucioles, F-06921, Sophia-Antipolis Cedex, France, vol. RAN WG1, No. Hangzhou; May 15, 2017-May 19, 2017, May 14, 2017 {May 14, 2017), XP051274009, 4 pages, section 2.

\* cited by examiner

CODE BLOCK GROUP BASED MULTIPLEXING

CROSS REFERENCE

The present Application for Patent is a Continuation of U.S. patent application Ser. No. 16/936,934 by LEI et al., entitled "CODE BLOCK GROUP BASED MULTIPLEXING" filed Jul. 23, 2020, which claims the benefit of U.S. Provisional Patent Application No. 62/878,084 by LEI et al., entitled "CODE BLOCK GROUP BASED MULTIPLEXING IN TWO-STEP RANDOM ACCESS PROCEDURES," filed Jul. 24, 2019, each of which are assigned to the assignee hereof, and each of which are expressly incorporated by reference herein.

BACKGROUND

The following relates generally to wireless communications, and more specifically to multiplexing techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support code block group (CBG) based multiplexing (e.g., in two-step random access procedures or uplink transmissions). Generally, the described techniques provide for a user equipment (UE) to identify a payload for inclusion in an uplink transmission. The UE may organize the payload into a CBG that includes one or more code blocks (CB). The UE may map each CB of the CBG to a corresponding uplink shared channel resource unit (e.g., a physical uplink shared channel resource unit) of an uplink transmission occasion of the first UE. The transmission occasion may also be shared with one or more additional UEs such that the CBG of the first UE is multiplexed with additional CBGs from the additional UEs. The UE may transmit, to a base station, the uplink message including each uplink shared channel resource unit on which the CBG is organized.

A method of wireless communication at a first UE is described. The method may include identifying a payload for inclusion by the first UE in an uplink transmission, organizing the payload into a code block group that includes one or more code blocks, mapping each code block of the code block group to a corresponding uplink shared channel resource unit of an uplink transmission occasion shared by the first UE with one or more additional UEs such that the code block group of the first UE is multiplexed with additional code block groups from the additional UEs, and transmitting, to a base station, the uplink transmission including each uplink shared channel resource unit on which the code block group is organized.

An apparatus for wireless communication at a first UE is described. The apparatus may include a processor, memory coupled with the processor, and instructions stored in the memory. The instructions may be executable by the processor to cause the apparatus to identify a payload for inclusion by the first UE in an uplink transmission, organize the payload into a code block group that includes one or more code blocks, map each code block of the code block group to a corresponding uplink shared channel resource unit of an uplink transmission occasion shared by the first UE with one or more additional UEs such that the code block group of the first UE is multiplexed with additional code block groups from the additional UEs, and transmit, to a base station, the uplink transmission including each uplink shared channel resource unit on which the code block group is organized.

Another apparatus for wireless communication at a first UE is described. The apparatus may include means for identifying a payload for inclusion by the first UE in an uplink transmission, organizing the payload into a code block group that includes one or more code blocks, mapping each code block of the code block group to a corresponding uplink shared channel resource unit of an uplink transmission occasion shared by the first UE with one or more additional UEs such that the code block group of the first UE is multiplexed with additional code block groups from the additional UEs, and transmitting, to a base station, the uplink transmission including each uplink shared channel resource unit on which the code block group is organized.

A non-transitory computer-readable medium storing code for wireless communication at a first UE is described. The code may include instructions executable by a processor to identify a payload for inclusion by the first UE in an uplink transmission, organize the payload into a code block group that includes one or more code blocks, map each code block of the code block group to a corresponding uplink shared channel resource unit of an uplink transmission occasion shared by the first UE with one or more additional UEs such that the code block group of the first UE is multiplexed with additional code block groups from the additional UEs, and transmit, to a base station, the uplink transmission including each uplink shared channel resource unit on which the code block group is organized.

Some examples of the method, apparatuses, and non-transitory computer-readable medium described herein may further include operations, features, means, or instructions for determining a payload segmentation threshold, comparing a size of the payload to the payload segmentation threshold, and organizing the payload into the code block group based on the comparing.

In some examples of the method, apparatuses, and non-transitory computer-readable medium described herein, the payload segmentation threshold may be based on a minimum payload size, a maximum payload size, a number of error checking bits attached to the payload, or a combination thereof.

Some examples of the method, apparatuses, and non-transitory computer-readable medium described herein may further include operations, features, means, or instructions for determining that a size of the payload may be smaller than the payload segmentation threshold based on the comparing, and padding one or more bits to the payload based on determining that the size of the payload may be smaller than the payload segmentation threshold.

In some examples of the method, apparatuses, and non-transitory computer-readable medium described herein, a number of the one or more padded bits may be equal to a difference between the payload segmentation threshold and the size of the payload.

Some examples of the method, apparatuses, and non-transitory computer-readable medium described herein may further include operations, features, means, or instructions for determining that a size of the payload may be larger than the payload segmentation threshold based on the comparing, attaching a set of error checking bits to the payload, and segmenting the payload into a set of code blocks including each code block of the code block group after attaching the set of error checking bits to the payload and based on determining that the size of the payload may be larger than the payload segmentation threshold.

Some examples of the method, apparatuses, and non-transitory computer-readable medium described herein may further include operations, features, means, or instructions for padding at least one of the set of code blocks with one or more bits based on the segmenting.

Some examples of the method, apparatuses, and non-transitory computer-readable medium described herein may further include operations, features, means, or instructions for attaching a second set of error checking bits to each of the set of code blocks.

Some examples of the method, apparatuses, and non-transitory computer-readable medium described herein may further include operations, features, means, or instructions for providing an indication of configuration information for the code block group to the base station.

In some examples of the method, apparatuses, and non-transitory computer-readable medium described herein, the configuration information includes a size of the code block group, an indication of the mapping from each code block to the corresponding uplink shared channel resource unit, or a combination thereof.

Some examples of the method, apparatuses, and non-transitory computer-readable medium described herein may further include operations, features, means, or instructions for identifying a preamble associated with the uplink transmission, determining a preamble resource identifier for the preamble based on the configuration information, and transmitting the preamble with the preamble resource identifier.

Some examples of the method, apparatuses, and non-transitory computer-readable medium described herein may further include operations, features, means, or instructions for identifying a set of preamble sequence indices and a set of random access occasion indices, partitioning the set of preamble sequence indices into a set of subsets of preamble sequence indices and the set of random access occasion indices into a set of subsets of random access occasion indices based on the configuration information, and determining the preamble resource identifier based on the partitioning.

Some examples of the method, apparatuses, and non-transitory computer-readable medium described herein may further include operations, features, means, or instructions for multiplexing uplink control information (UCI) associated with the configuration information with at least one of the uplink shared channel resource units.

Some examples of the method, apparatuses, and non-transitory computer-readable medium described herein may further include operations, features, means, or instructions for determining to transmit the uplink transmission as part of a contention-free random access procedure, receiving signaling from the base station indicating a resource mapping, and mapping each code block to the corresponding uplink shared channel resource unit based on the resource mapping.

In some examples of the method, apparatuses, and non-transitory computer-readable medium described herein, the signaling includes downlink control information (DCI) signaling, radio resource control (RRC) signaling, or a combination thereof.

Some examples of the method, apparatuses, and non-transitory computer-readable medium described herein may further include operations, features, means, or instructions for determining to transmit the uplink transmission as part of a contention-based random access procedure, receiving signaling indicating a set of rules for performing resource mapping for the uplink transmission, and mapping each code block to the corresponding uplink shared channel resource unit based on the set of rules.

In some examples of the method, apparatuses, and non-transitory computer-readable medium described herein, the set of rules indicate to perform the resource mapping randomly within a configured pool of resources.

In some examples of the method, apparatuses, and non-transitory computer-readable medium described herein, the signaling includes system information signaling, RRC signaling, or a combination thereof.

Some examples of the method, apparatuses, and non-transitory computer-readable medium described herein may further include operations, features, means, or instructions for selecting a channel coding scheme to encode each code block of the code block group, and encoding each code block of the code block group according to the selected channel coding scheme.

Some examples of the method, apparatuses, and non-transitory computer-readable medium described herein may further include operations, features, means, or instructions for scrambling the code block group at a bit level according to a scrambling identifier.

In some examples of the method, apparatuses, and non-transitory computer-readable medium described herein, the scrambling identifier may be UE-specific and cell-specific.

In some examples of the method, apparatuses, and non-transitory computer-readable medium described herein, the scrambling identifier may be based on a preamble resource identifier, a code block group size, a reference signal resource index, an uplink shared channel resource unit index, or a combination thereof.

Some examples of the method, apparatuses, and non-transitory computer-readable medium described herein may further include operations, features, means, or instructions for identifying a minimum payload size and a maximum payload size, and organizing the payload into the code block group based on the minimum payload size and the maximum payload size.

In some examples of the method, apparatuses, and non-transitory computer-readable medium described herein, the minimum payload size and the maximum payload size may be identified based on a cell identifier, a random access procedure type, a transmission occasion number, or a combination thereof.

Some examples of the method, apparatuses, and non-transitory computer-readable medium described herein may further include operations, features, means, or instructions for multiplexing each corresponding uplink shared channel resource unit with a resource of a reference signal.

In some examples of the method, apparatuses, and non-transitory computer-readable medium described herein, the reference signal may be a demodulation reference signal (DMRS).

In some examples of the method, apparatuses, and non-transitory computer-readable medium described herein, a configuration of the resource of the reference signal may be based on a number of symbols spanned by the DMRS, a number of resource blocks or sub-physical-resource-blocks (sub-PRBs) spanned by the DMRS, an index of an antenna port associated with the DMRS, a DMRS sequence, a mapping type, a precoding or beamforming index associated with the DMRS, or a combination thereof.

In some examples of the method, apparatuses, and non-transitory computer-readable medium described herein, the DMRS sequence may be spread by an orthogonal cover code (OCC) in a time domain, a frequency domain, or a combination thereof.

In some examples of the method, apparatuses, and non-transitory computer-readable medium described herein, a configuration of each uplink shared channel resource unit may be based on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

In some examples of the method, apparatuses, and non-transitory computer-readable medium described herein, the corresponding uplink shared channel resource may be a physical uplink shared channel (PUSCH) resource.

In some examples of the method, apparatuses, and non-transitory computer-readable medium described herein, a size of the code block group may be based on a range of a size of the payload, a random access procedure type, a system bandwidth, system loading, a transmission occasion number, or a combination thereof.

In some examples of the method, apparatuses, and non-transitory computer-readable medium described herein, the corresponding uplink shared channel resource units include a first uplink shared channel resource unit associated with a first code block of the code block group and a second uplink shared channel resource unit associated with a second code block of the code block group.

In some examples of the method, apparatuses, and non-transitory computer-readable medium described herein, the first uplink shared channel resource unit and the second uplink shared channel resource unit overlap in time, frequency, space, or a combination thereof.

In some examples of the method, apparatuses, and non-transitory computer-readable medium described herein, the first uplink shared channel resource unit and the second uplink shared channel resource unit overlap in time and may be contiguous in frequency.

In some examples of the method, apparatuses, and non-transitory computer-readable medium described herein, the first uplink shared channel resource unit and the second uplink shared channel resource unit overlap in frequency and may be contiguous in time.

In some examples of the method, apparatuses, and non-transitory computer-readable medium described herein, the first uplink shared channel resource unit and the second uplink shared channel resource unit may be disjoint in time and frequency.

A method of wireless communications at a base station is described. The method may include receiving, from a first UE and during an uplink transmission occasion that includes a set of uplink shared channel resource units, a first uplink transmission, receiving, from one or more additional UEs and during the uplink transmission occasion, additional uplink messages multiplexed across the set of uplink shared channel resource units with the first uplink message, identifying one or more first uplink shared channel resource units of the set of uplink shared channel resource units, the one or more first uplink shared channel resource units each including a corresponding code block of a first code block group that includes the first uplink message, and decoding the first uplink message by decoding the one or more first uplink shared channel resource units.

An apparatus for wireless communications at a base station is described. The apparatus may include a processor, memory coupled with the processor, and instructions stored in the memory. The instructions may be executable by the processor to cause the apparatus to receive, from a first UE and during an uplink transmission occasion that includes a set of uplink shared channel resource units, a first uplink transmission, receive, from one or more additional UEs and during the uplink transmission occasion, additional uplink messages multiplexed across the set of uplink shared channel resource units with the first uplink message, identify one or more first uplink shared channel resource units of the set of uplink shared channel resource units, the one or more first uplink shared channel resource units each including a corresponding code block of a first code block group that includes the first uplink message, and decode the first uplink message by decoding the one or more first uplink shared channel resource units.

Another apparatus for wireless communications at a base station is described. The apparatus may include means for receiving, from a first UE and during an uplink transmission occasion that includes a set of uplink shared channel resource units, a first uplink transmission, receiving, from one or more additional UEs and during the uplink transmission occasion, additional uplink messages multiplexed across the set of uplink shared channel resource units with the first uplink message, identifying one or more first uplink shared channel resource units of the set of uplink shared channel resource units, the one or more first uplink shared channel resource units each including a corresponding code block of a first code block group that includes the first uplink message, and decoding the first uplink message by decoding the one or more first uplink shared channel resource units.

A non-transitory computer-readable medium storing code for wireless communications at a base station is described. The code may include instructions executable by a processor to receive, from a first UE and during an uplink transmission occasion that includes a set of uplink shared channel resource units, a first uplink transmission, receive, from one or more additional UEs and during the uplink transmission occasion, additional uplink messages multiplexed across the set of uplink shared channel resource units with the first uplink message, identify one or more first uplink shared channel resource units of the set of uplink shared channel resource units, the one or more first uplink shared channel resource units each including a corresponding code block of a first code block group that includes the first uplink message, and decode the first uplink message by decoding the one or more first uplink shared channel resource units.

Some examples of the method, apparatuses, and non-transitory computer-readable medium described herein may further include operations, features, means, or instructions for receiving an indication of configuration information for the first code block group from the first UE.

In some examples of the method, apparatuses, and non-transitory computer-readable medium described herein, the configuration information includes a size of the first code block group, an indication of the mapping from each code block to the corresponding uplink shared channel resource unit, or a combination thereof.

Some examples of the method, apparatuses, and non-transitory computer-readable medium described herein may further include operations, features, means, or instructions for receiving a preamble associated with the first uplink message, determining a preamble resource identifier for the preamble, and identifying the configuration information for the first code block group based on the preamble resource identifier.

Some examples of the method, apparatuses, and non-transitory computer-readable medium described herein may further include operations, features, means, or instructions for identifying a set of preamble sequence indices and a set of random access occasion indices, partitioning the set of preamble sequence indices into a set of subsets of preamble sequence indices and the set of random access occasion indices into a set of subsets of random access occasion indices based on the configuration information, and identifying the configuration information based on the partitioning.

Some examples of the method, apparatuses, and non-transitory computer-readable medium described herein may further include operations, features, means, or instructions for identifying uplink control information (UCI) multiplexed with at least one of the one or more first uplink shared channel resource units, decoding the uplink control information, and determining the configuration information for the first code block group based on decoding the uplink control information.

Some examples of the method, apparatuses, and non-transitory computer-readable medium described herein may further include operations, features, means, or instructions for identifying a set of error checking bits attached to each corresponding code block, and decoding the first uplink message based on the set of error checking bits attached to each corresponding code block.

Some examples of the method, apparatuses, and non-transitory computer-readable medium described herein may further include operations, features, means, or instructions for organizing each corresponding code block together into a payload, identifying a set of error checking bits attached to the payload, and decoding the first uplink message based on the set of error checking bits attached to the payload.

Some examples of the method, apparatuses, and non-transitory computer-readable medium described herein may further include operations, features, means, or instructions for transmitting signaling to the first UE indicating a resource mapping, and receiving the first uplink message as part of a contention free random access procedure based on transmitting the signaling indicating the resource mapping.

In some examples of the method, apparatuses, and non-transitory computer-readable medium described herein, the signaling includes DCI signaling, RRC signaling, or a combination thereof.

Some examples of the method, apparatuses, and non-transitory computer-readable medium described herein may further include operations, features, means, or instructions for transmitting signaling indicating a set of rules for performing resource mapping, and receiving the first uplink message from the first UE as part of a contention-based random access procedure based on transmitting the signaling indicating the set of rules.

In some examples of the method, apparatuses, and non-transitory computer-readable medium described herein, the set of rules indicate to perform the resource mapping randomly within a configured pool of resources.

In some examples of the method, apparatuses, and non-transitory computer-readable medium described herein, the signaling includes system information signaling, RRC signaling, or a combination thereof.

Some examples of the method, apparatuses, and non-transitory computer-readable medium described herein may further include operations, features, means, or instructions for selecting a channel decoding scheme to decode each corresponding code block, and decoding each corresponding code block according to the selected channel decoding scheme.

Some examples of the method, apparatuses, and non-transitory computer-readable medium described herein may further include operations, features, means, or instructions for descrambling the first code block group at a bit level according to a scrambling identifier.

In some examples of the method, apparatuses, and non-transitory computer-readable medium described herein, the scrambling identifier may be UE-specific and cell-specific.

In some examples of the method, apparatuses, and non-transitory computer-readable medium described herein, the scrambling identifier may be based on a preamble resource identifier, a size of the first code block group, a reference signal resource index, an uplink shared channel resource unit index, or a combination thereof.

Some examples of the method, apparatuses, and non-transitory computer-readable medium described herein may further include operations, features, means, or instructions for identifying a minimum payload size and a maximum payload size, and decoding the first uplink message based on the minimum payload size and the maximum payload size.

In some examples of the method, apparatuses, and non-transitory computer-readable medium described herein, the minimum payload size and the maximum payload size may be identified based on a cell identifier, a random access procedure type, a transmission occasion number, or a combination thereof.

Some examples of the method, apparatuses, and non-transitory computer-readable medium described herein may further include operations, features, means, or instructions for identifying, for each of the one or more first uplink shared channel resource units, a resource of a reference signal, and decoding the first uplink message based on identifying the resource of the reference signal for each of the one or more first uplink shared channel resource units.

In some examples of the method, apparatuses, and non-transitory computer-readable medium described herein, the reference signal may be a DMRS.

In some examples of the method, apparatuses, and non-transitory computer-readable medium described herein, a configuration of the resource of the reference signal may be based on a number of symbols spanned by the DMRS, a number of resource blocks or sub-PRBs spanned by the DMRS, an index of an antenna port associated with the DMRS, a DMRS sequence, a mapping type, a precoding or beamforming index associated with the DMRS, or a combination thereof.

In some examples of the method, apparatuses, and non-transitory computer-readable medium described herein, the DMRS sequence may be spread by an OCC in a time domain, a frequency domain, a combination thereof.

In some examples of the method, apparatuses, and non-transitory computer-readable medium described herein, a configuration of each of the one or more first uplink shared channel resource units may be based on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

In some examples of the method, apparatuses, and non-transitory computer-readable medium described herein, the corresponding uplink shared channel resource may be a PUSCH resource.

In some examples of the method, apparatuses, and non-transitory computer-readable medium described herein, a size of the first code block group may be based on a range of a size of a payload, a random access procedure type, a system bandwidth, system loading, a transmission occasion number, or a combination thereof.

In some examples of the method, apparatuses, and non-transitory computer-readable medium described herein, the one or more first uplink shared channel resource units include a first uplink shared channel resource unit associated with a first code block of the first code block group and a second uplink shared channel resource unit associated with a second code block of the first code block group.

In some examples of the method, apparatuses, and non-transitory computer-readable medium described herein, the first uplink shared channel resource unit and the second uplink shared channel resource unit overlap in time, frequency, space, or a combination thereof.

In some examples of the method, apparatuses, and non-transitory computer-readable medium described herein, the first uplink shared channel resource unit and the second uplink shared channel resource unit overlap in time and may be contiguous in frequency.

In some examples of the method, apparatuses, and non-transitory computer-readable medium described herein, the first uplink shared channel resource unit and the second uplink shared channel resource unit overlap in frequency and may be contiguous in time.

In some examples of the method, apparatuses, and non-transitory computer-readable medium described herein, the first uplink shared channel resource unit and the second uplink shared channel resource unit may be disjoint in time and frequency.

DETAILED DESCRIPTION

Figure 1:
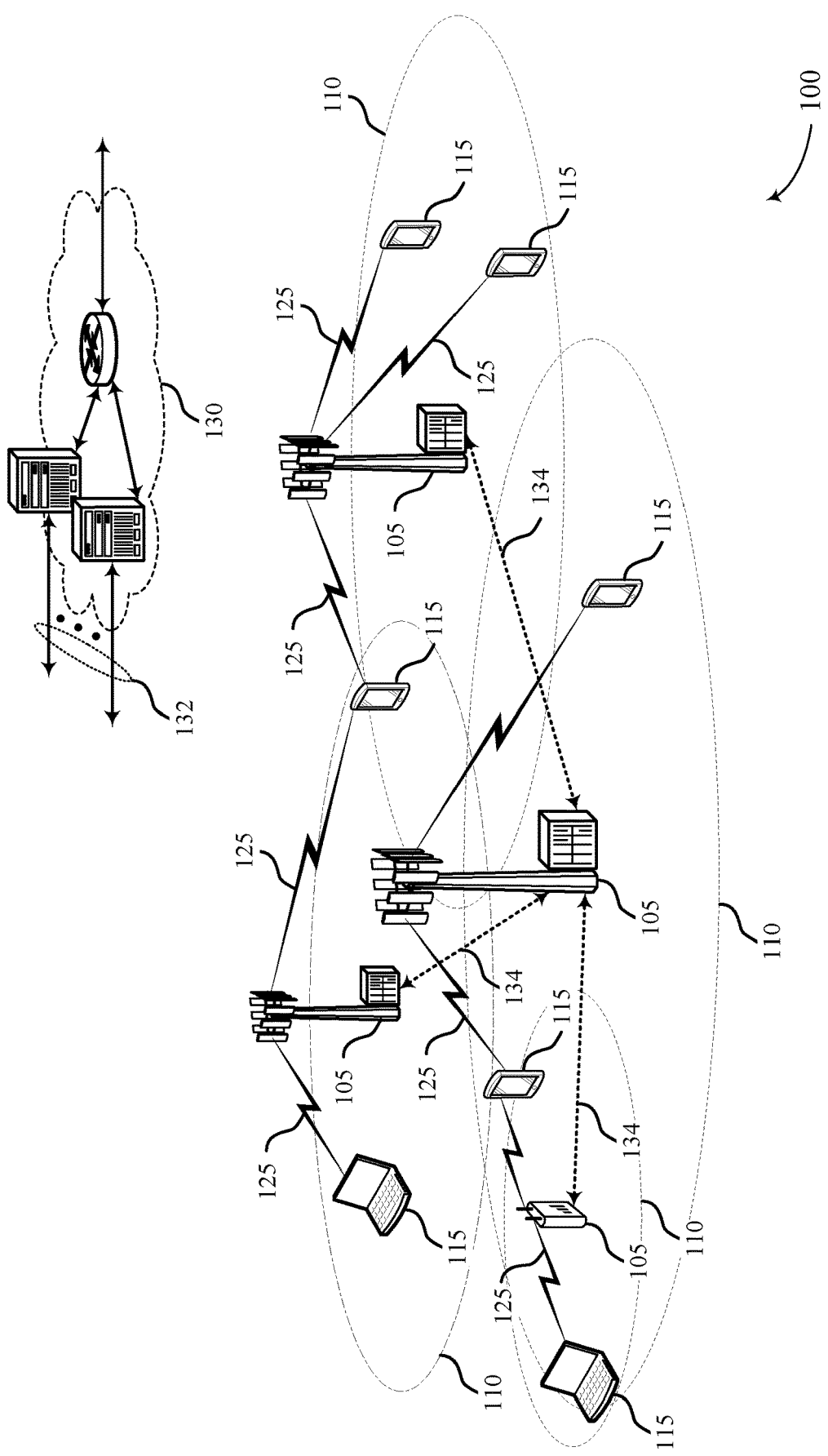
FIG. 1 illustrates an example of a wireless communications system that supports code block group (CBG) based multiplexing (e.g., in two-step random access procedures or uplink transmissions) in accordance with aspects of the present disclosure.

In some examples, a user equipment (UE) may perform uplink transmission with a base station. Performing the uplink transmission may involve the UE transmitting an uplink message, and the base station may respond with an acknowledgment of the uplink message or downlink message. For example, when the UE performs a two-step random access procedure with the base station, the two-step random access procedure may involve the UE transmitting an uplink random access message and the base station responding with a downlink random access message. If the base station fails to receive and/or decode the uplink message, the base station may transmit an indication of failure and the UE may retransmit the entire uplink message. However, the retransmission may potentially introduce interference.

To mitigate how much of the payload is being retransmitted on average, the UE may organize the payload into a number of code blocks (CBs) that make up a code block group (CBG) and may map each CB to a physical uplink shared channel (PUSCH) resource unit (PRU). If the base station successfully receives and decodes a CB, the base station may provide an indication of success to the UE for that CB and, if the base station fails to receive and decode a CB, the base station may provide an indication of failure. Upon receiving the indications, the UE may transmit a retransmission that includes the CBs which the base station failed to decode. Such a transmission may use fewer resources in time, frequency, space, or a combination thereof than a transmission in which the entire message is transmitted.

In some cases, different UEs performing random access channel (RACH) procedures may transmit uplink random access messages with different payload sizes and, as such, the CBG size (e.g., the number of CBs in a CBG) may be different for each of the uplink random access messages. In such cases, resource utilization efficiency may be increased by multiplexing PRUs carrying CBs of an uplink random access message from a UE with CBs of an uplink random access messages from other UEs. In some cases, different UEs performing uplink configured grant transmissions may transmit uplink configured grant transmissions or messages with different payload sizes and, as such, the CBG size (e.g., the number of CBs in a CBG) may be different for each of the uplink messages. In such cases, resource utilization efficiency may be increased by multiplexing PRUs carrying CBs of an uplink configured grant transmission or message from a UE with CBs of uplink configured grant transmissions or messages from other UEs Described herein are methods of organizing a payload for an uplink message into a CBG. Methods of mapping from CBGs to PRUs are also described. Additionally, methods of indicating a configuration of the CBG (e.g., CBG size, a mapping from CBG to PRU, or both) are described.

Aspects of the disclosure are initially described in the context of a wireless communications system. Additional aspects of the disclosure are described in the context of an additional wireless communications system, resource mapping schemes, a CBG multiplexing sch Aspects of the disclosure are further illustrated by and described with reference to apparatus diagrams, system diagrams, and flowcharts that relate to CBG based multiplexing in two-step RACH.

FIG. 1 illustrates an example of a wireless communications system 100 that supports CBG based multiplexing (e.g., in two-step random access procedures or uplink transmissions) in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. In some cases, reference signals may include a demodulation reference signal (DMRS). For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a UE 115 may perform contention-based random access (CBRA). In CBRA, a UE 115 may transmit an uplink random access message at any time and collisions may occur between the uplink random access message sent from the UE 115 and other transmissions. If the other transmissions consist of uplink random access messages from other UEs 115, the collision may be referred to as contention. In such cases, the base station 105 may perform various methods to resolve the contention. Alternatively, the UE 115 may perform contention-free random access (CFRA). In CFRA, the UE 115 may receive an indication (e.g., a grant) from a base station 105 indicating when an uplink random access message may be transmitted.

A UE 115 may identify a payload for inclusion in an uplink random access message of a two-step random access procedure. The UE 115 may organize the payload into a CBG that includes one or more CB. The UE 115 may map each CB of the CBG to a corresponding uplink shared channel resource unit (e.g., a physical uplink shared channel resource unit) of an uplink random access transmission occasion of the first UE 115. The transmission occasion may also be shared with one or more additional UEs 115 such that the CBG of the first UE 115 is multiplexed with additional CBGs from the additional UEs 115. The UE 115 may transmit, to a base station, the uplink random access message including each uplink shared channel resource unit on which the CBG is organized.

Figure 2:
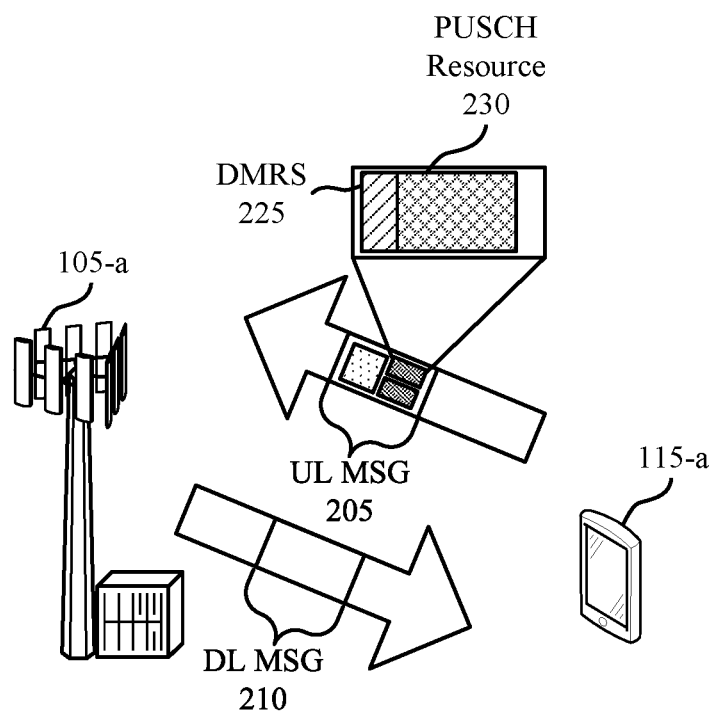
FIG. 2 illustrates an example of a wireless communications system that supports CBG based multiplexing (e.g., in two-step random access procedures or uplink transmissions) in accordance with aspects of the present disclosure.
Figure 2:
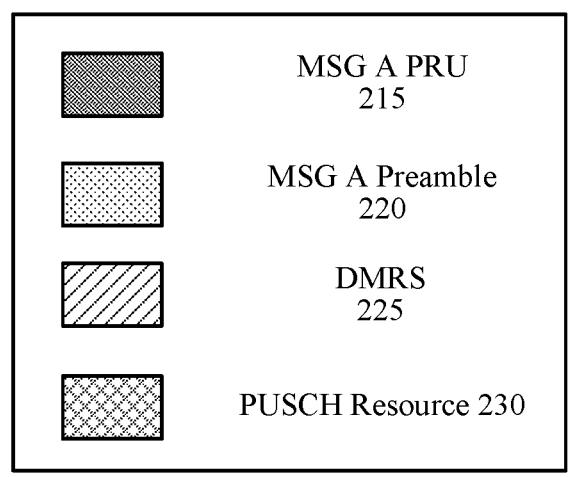

In some cases, a UE 115 may perform a procedure involving uplink configured grants. A UE 115 may transmit an uplink configured grant transmission or message and collisions may occur between the uplink configured grant transmission or message sent from the UE 115 and other transmissions. A UE 115 may identify a payload for inclusion in an uplink configured grant transmission or message. The UE 115 may organize the payload into a CBG that includes one or more CB. The UE 115 may map each CB of the CBG to a corresponding uplink shared channel resource unit (e.g., a physical uplink shared channel resource unit) of an uplink transmission occasion of the first UE 115. The transmission occasion may also be shared with one or more additional UEs 115 such that the CBG of the first UE 115 is multiplexed with additional CBGs from the additional UEs 115. The UE 115 may transmit, to a base station, the uplink configured grant transmission or message including each uplink shared channel resource unit on which the CBG is organized FIG. 2 illustrates an example of a wireless communications system 200 that supports CBG based multiplexing (e.g., in two-step random access procedures or uplink transmissions) in accordance with aspects of the present disclosure. In some examples, wireless communications system 200 may implement aspects of wireless communications system 100. For instance, wireless communications system 200 may include base station 105-a and UE 115-a, which may be examples of a base station 105 and a UE 115, respectively.

UE 115-a and base station 105-a may support two-step random access procedures. Where a four-step random access procedure includes two separate uplink transmissions (e.g., steps 1 and 3) and two separate downlink transmissions (e.g., steps 2 and 4) for a UE 115 to establish an RRC connection with a base station 105, a two-step random access procedure may establish an RRC connection with an uplink message 205 (e.g., an uplink random access message) and a downlink random access message 210. Therefore, a two-step random access procedure may provide benefits of reduced signaling overhead and reduced latency when compared to a four-step random access procedure.

Two-step random access procedures may operate in any RRC state and may be triggered. For instance, a two-step random access procedure may be triggered by an initial access procedure, an RRC connection re-establishment procedure, a handover procedure, an uplink re-sync or secondary cell time alignment procedure, a request for system information, a beam failure recovery procedure, or a combination thereof. Generally, two-step random access procedure may be employed by a premium UE 115 or a low-tier UE 115 to reduce the signaling overhead and latency in initial access and small data transfer.

The uplink message 205 may include a random access preamble 220 and resources for an uplink shared channel. For example, an uplink random access message may include a random access preamble and one or more PRUs 215. In an uplink message 205 (e.g., an uplink random access message) of a two-step random access procedure, UE 115-a may transmit both a random access preamble 220 (e.g., step one of a four-step random access procedure) and an RRC connection request in at least one of the one or more PRUs 215 (e.g., step three of a four-step random access procedure). Each PRU 215 may include a DMRS resource 225 and a PUSCH resource 230. In some cases, the uplink message 205 may be an uplink random access message referred to as message A, or MsgA. In some cases, the uplink message 205 may be an uplink configured grant (e.g., a configured grant Type 1 or Type2 PUSCH transmission). In some cases, the uplink message 205 may be transmitted without a preamble.

Generally, the DMRS resource 225 of a PRU 215 may be configured according to a set of parameters. Such parameters may include a number of DMRS symbols spanned by the DMRS resource 225, a number of RBs or sub-PRBs spanned by the DMRS resource 225, an index of an antenna port associated with the DMRS resource 225, a selection of DMRS sequence and mapping type, a precoding or beamforming index, or a combination thereof. In some cases, the selected DMRS sequence may be spread in the time domain, the frequency domain, or both by an orthogonal cover code (OCC) applied on top of the DMRS symbols. Likewise, the PUSCH resource 230 may be configured according to a set of parameters. The set of parameters may include a number of PUSCH symbols spanned by the PUSCH resource 230, a number of RBs or PRBs spanned by the PUSCH resource 230, a precoding or beamforming index, a selection of UE and/or cell specific multiple access signatures at a bit or resource element (RE) level, or a combination thereof. Some examples of multiple access signatures may include a scrambling sequence, a spreading code, or an interleaving pattern.

In some cases, each PUSCH resource 230 may carry a respective code block (CB) of a CBG of the uplink message 205 (e.g., an uplink random access message). Depending on the use-case of the two-step RACH (e.g., the type of procedure triggering the two-step RACH), the payload size of the uplink message 205 or size of CBGs in the uplink message 205 may vary. As a payload size of an uplink message 205 increases, a number of CBs and a number of PRUs 215 transmitted may also increase. Assuming a fraction of CBs of the uplink message 205 are received with errors (e.g., due to interference, channel fading, noise), UE 115-a may retransmit the fraction (i.e., the failed CBs).

On each transmission occasion of the uplink message 205, a finite and configurable number of CBG sizes may be supported on each transmission occasion. In some cases, the number of CBG sizes may be configured based on a range of the payload size of the uplink message 205. Additionally or alternatively, the number of CBG sizes may be configured based on a random access procedure type (e.g., CBRA or CFRA), a system bandwidth, system loading, or a combination thereof.

In response to the uplink message 205, base station 105-a may transmit a downlink message 210 (e.g., a downlink random access message). The downlink message 210 of the two-step random access procedure may include a random access response (e.g., step two of a four-step random access procedure) and an acknowledgment for the RRC connection request (e.g., step four of a four-step random access procedure). The downlink message 210 may be referred to as message B or MsgB.

In some cases, uplink messages 205 from multiple UEs 115 with different CBG sizes, including UE 115-a, may be multiplexed on at least partially overlapping radio resources. For instance, one or more PRUs 215 from a first uplink message 205 (e.g., a first uplink random access message) may overlap at least partially in time and frequency with one or more PRUs 215 from a second uplink message 205 (e.g., a second uplink random access message). For CBRA, such multiplexing may be non-orthogonal and subject to random multi-user interference. For CFRA, such multiplexing may be orthogonal or non-orthogonal. Multiplexing multiple uplink messages 205 on at least partially overlapping radio resources may improve the efficiency of resource utilization, may enhance the flexibility of CBRA and CFRA, and may reduce the complexity of blind detection by base station 105-a. An example of such a situation may be described in greater detail with reference to FIG. 4.

To enable CBG-based multiplexing for the uplink message 205, UE 115-a may construct a CBG for the uplink random access message and may determine or identify a mapping of each CBG to one or more PRUs 215. More details about UE 115-a may perform the mapping may be described with reference to FIGS. 3A, 3B, and 3C. Additionally, UE 115-a may construct the CBs according to properties of the uplink message 205 (e.g., according to a size of the uplink message 205 such as an uplink random access message or an uplink configured grant). More details of how UE 115-a may perform CB construction for the uplink message 205 may be described with reference to FIG. 5. In the case that UE 115-a is transmitting the uplink message 205 as part of performing CBRA, UE 115-a may indicate a size of the CBG, a mapping of each CB of the CBG to PRUs 215, or a combination thereof to base station 105-a. Providing such an indication may aid base station 105-a in locating the PRUs 215 containing the CBs corresponding to the received uplink message 205. Details of how UE 115-a may include the indication may be described with reference to FIG. 5.

Figure 3A:
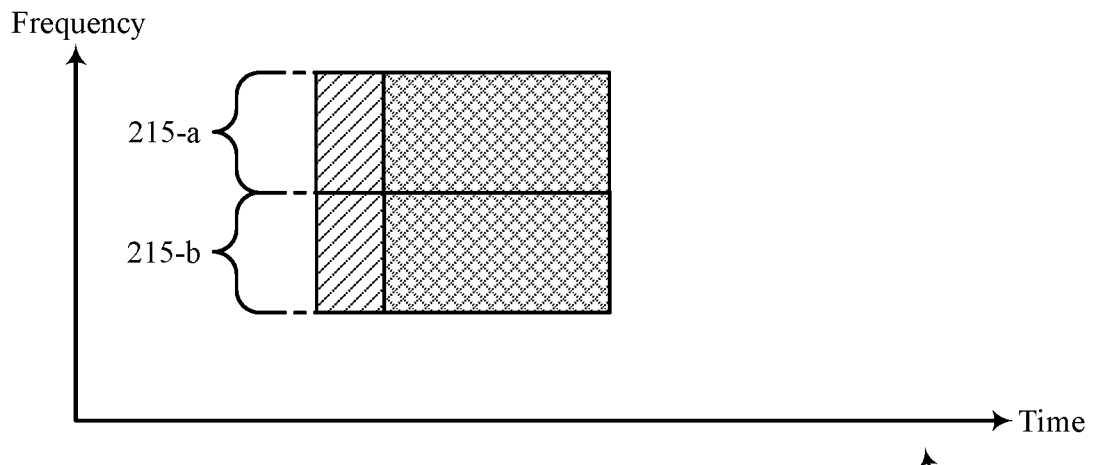
FIGS. 3A, 3B, and 3C illustrate examples of resource mapping schemes that support CBG based multiplexing (e.g., in two-step random access procedures or uplink transmissions) in accordance with aspects of the present disclosure.
Figure 3B:
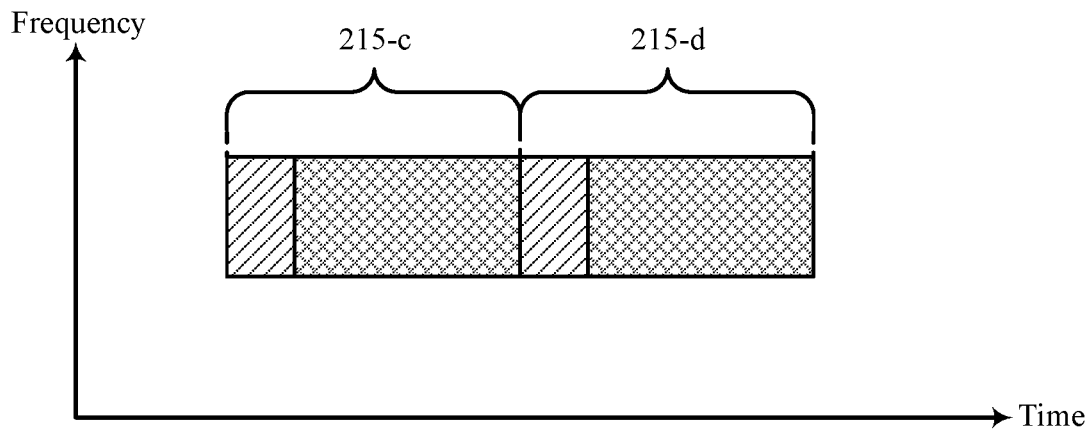
Figure 3C:
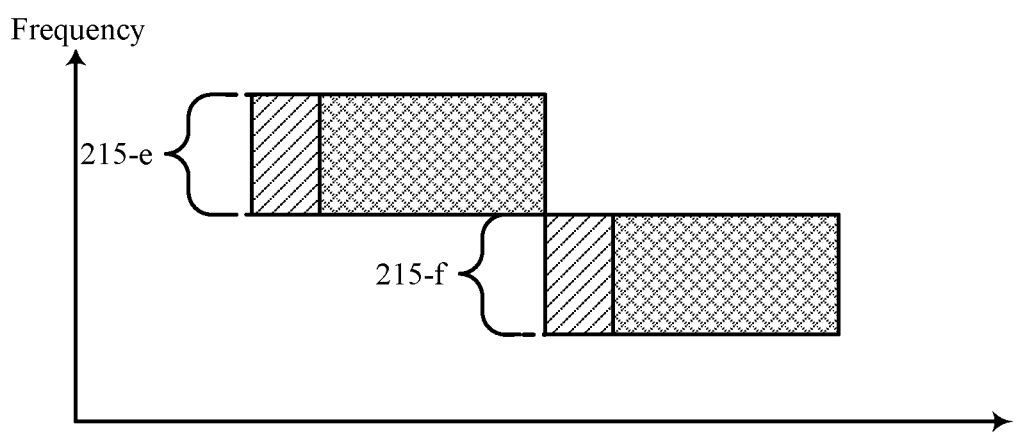

FIGS. 3A, 3B, and 3C illustrates examples of resource mapping schemes 300-a, 300-b, and 300-c that support CBG based multiplexing (e.g., in two-step random access procedures or uplink transmissions) in accordance with aspects of the present disclosure. In some examples, resource mapping schemes 300-a, 300-b, and 300-c may implement aspects of wireless communications system 100. For instance, resource mapping schemes 300-a, 300-b, and 300-c may be used by a UE 115 when performing CBG to PRU resource mapping as described in FIG. 2. In some cases, resource mapping schemes 300-a, 300-b, and 300-c may represent mappings for a CBG with a size of 2 CBs.

As described with regards to FIG. 2, a UE 115 may identify or determine a mapping of CBs of a CBG to a number of PRUs associated with an uplink message 205 and may transmit the CBs over the PRUs to a base station 105 as part of a 2-RACH procedure. FIG. 3A may demonstrate an example of a mapping of 2 CBs to PRUs 215-a and 215-b, respectively, which overlap in time and are contiguous in frequency. FIG. 3B, meanwhile, may demonstrate an example of a mapping of 2 CBs to PRUs 215-c and 215-d, respectively, which overlap in frequency and are contiguous in time. FIG. 3C may demonstrate an example of a mapping of 2 CBs to PRUs 215-e and 215-f, respectively, which are disjoint in time and frequency.

It should be noted that the methods described herein may be extended to CBGs of larger sizes. For instance, a CBG of size 3 may be associated with 3 PRUs contiguous in frequency and overlapping in time, 3 PRUs contiguous in time and overlapping in frequency, or 3 PRUs disjoint in time and frequency. Additionally, one or more combinations of the methods described herein may be used for CBGs of sizes higher than 2 CBs. For instance, for a CBG of size 3, a first PRU associated with the CBG may be contiguous in time and overlapping in frequency with a second PRU associated with the CBG and may be overlapping in time and contiguous in frequency with a third PRU. The second PRU and the third PRU may be disjoint in time and frequency.

Generally, if a UE 115 is transmitting an uplink message 205 as part of performing CFRA, a base station 105 may determine the mapping and may transmit an indication of the mapping via control signaling (e.g., downlink control information (DCI), RRC, MAC-CE) to the UE 115. The UE 115, which may be a scheduled UE 115, may identify the mapping from the control signaling. Alternatively, if the UE 115 is transmitting the uplink message 205 as part of performing CBRA, the UE 115 may use a set of rules or options for resource mapping to determine the mapping. The rules or options may be indicated by signaling, such as system information or RRC signaling. In one example, each UE 115 may randomly select the radio resource based on the rules or options broadcast by a base station 105.

Figure 4:
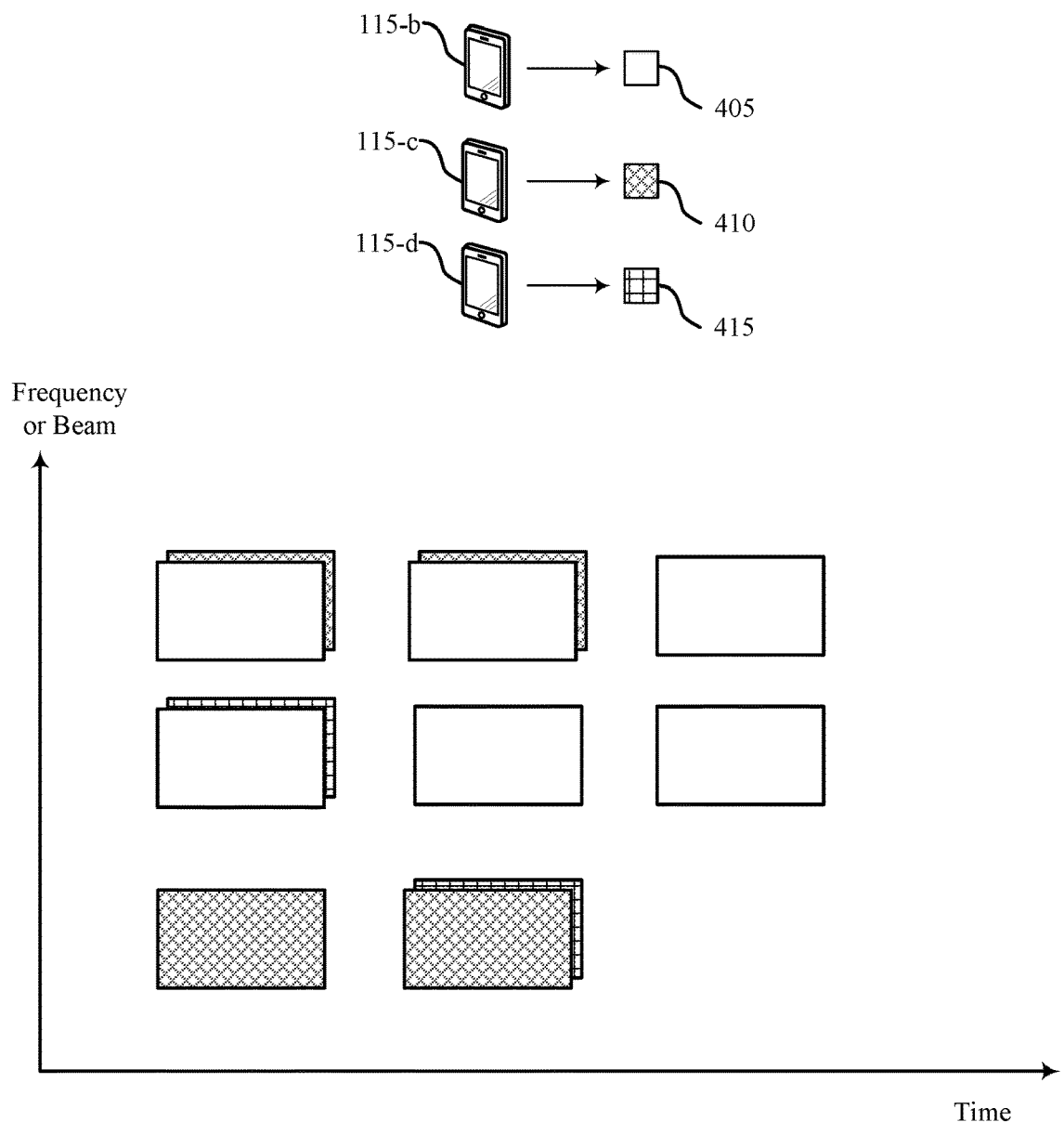
FIG. 4 illustrates an example of a CBG multiplexing scheme that supports CBG based multiplexing (e.g., in two-step random access procedures or uplink transmissions) in accordance with aspects of the present disclosure.

FIG. 4 illustrates an example of a CBG multiplexing scheme 400 that supports CBG based multiplexing (e.g., in two-step random access procedures or uplink transmissions) in accordance with aspects of the present disclosure. In some examples, CBG multiplexing scheme 400 may implement aspects of wireless communications system 100. For instance, CBG multiplexing scheme 400 may represent overlapping uplink transmissions or messages received at a base station 105 from multiple UEs 115 (e.g., UEs 115-b, 115-c, and 115-d). CBG multiplexing scheme 400 may include PRUs 405, 410, and 415, which may be examples of a PRU 215 described with reference to FIG. 2.

PRUs 405 may be associated with a first CBG corresponding to an uplink message 205 transmitted from UE 115-b; PRUs 410 may be associated with a second CBG corresponding to an uplink message 205 transmitted from UE 115-c; and PRUs 415 may be associated with a third CBG corresponding to an uplink message 205 transmitted from UE 115-d. In the present example, the first CBG may have a size of K1 CBs (e.g., 6 CBs), the second CBG may have a size of K2 CBs (e.g., 4 CBs), and the third CBG may have a size of K3 CBs (e.g., 2 CBs).

If the PRUs 405, 410, and 415 were not multiplexed, a greater number of time and frequency resources may be used to transmit the respective uplink messages 205 associated with the PRUs. By placing the PRUs 405, 410, and 415 in overlapping resources, any interference generated by those PRUs may be constrained to a smaller spectrum of time and frequency. Additionally or alternatively, a greater number of resources may be available for performing other operations (e.g., communications with other base stations 105 or UEs 115).

Figure 5:
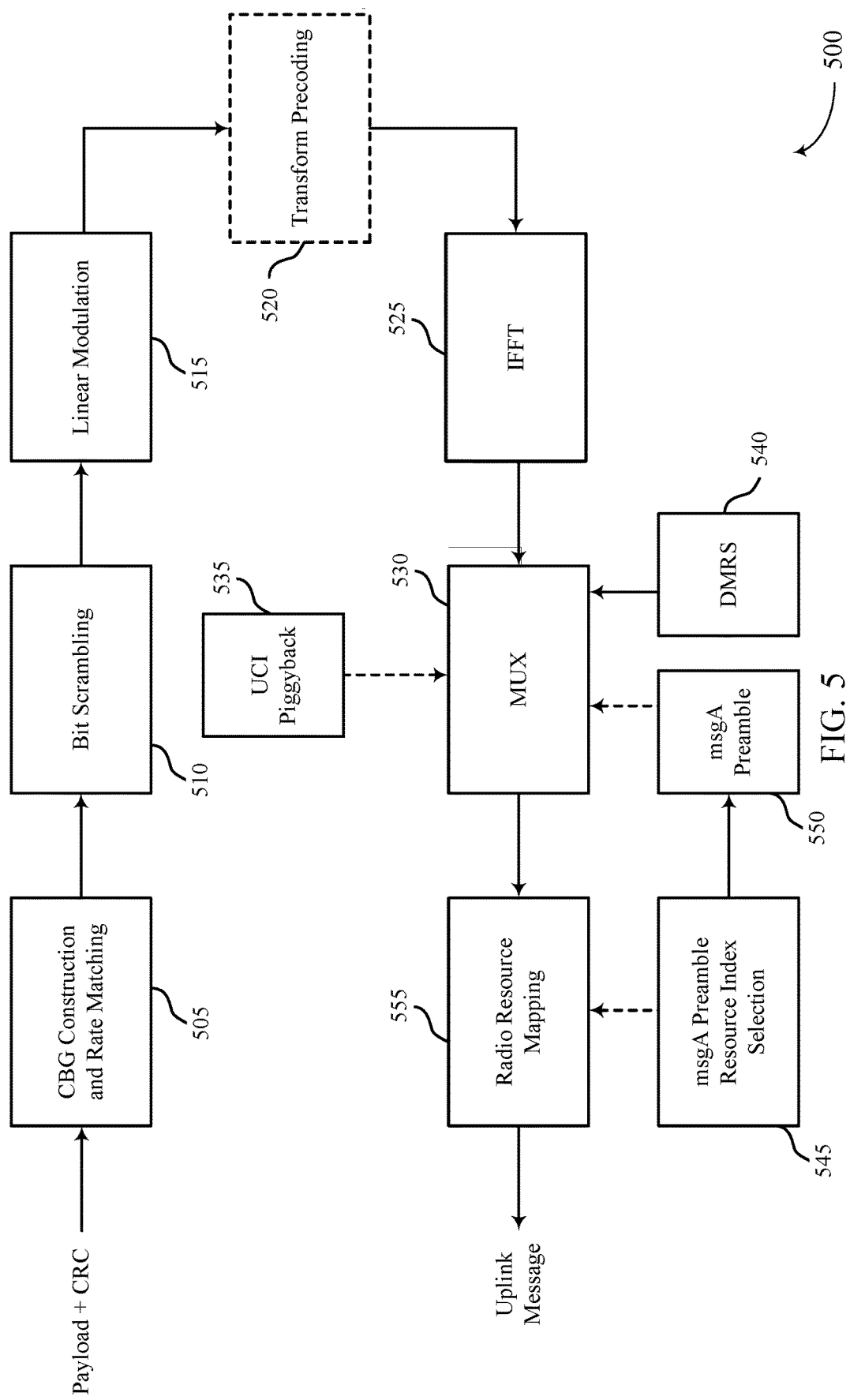
FIG. 5 illustrates an example of an uplink message construction scheme that supports CBG based multiplexing (e.g., in two-step random access procedures or uplink transmissions) in accordance with aspects of the present disclosure.

FIG. 5 illustrates an example of an uplink message construction scheme 500 that supports CBG based multiplexing (e.g., in two-step random access procedures or uplink transmissions) in accordance with aspects of the present disclosure. In some examples, uplink message construction scheme 500 may implement aspects of wireless communications system 100. For instance, uplink message construction scheme 500 may represent a set of operations that a UE 115 performs on a message payload and, in some cases, a set of cyclic redundancy check (CRC) bits to generate an uplink message, such as uplink message 205 as described with reference to FIG. 2.

At 505, the UE 115 may identify a payload for the uplink message 205 and may organize the payload into a CBG. In some cases, the UE 115 may also identify one or more cyclic redundancy check (CRC) bits $C_1$ to attach or other integrate with the payload. In some cases, $C_1$ may be a configurable value.

Upon identifying the payload and the $C_1$ CRC bits, the UE may encode and parse the payload into a CB G. Initially, the UE 115 may determine or identify a threshold $L_0$ for segmentation of the payload. In some cases, the range of $L_0$ may be given by $L_{min} \leq L_0 \leq (L_{max}+C_1)/2$, where $L_{min}$ may correspond to a minimum payload size of the uplink message 205 and $L_{max}$ may correspond to a maximum payload size of the uplink message 205. Generally, $L_{min}$ and $L_{max}$ may define a range of payload sizes for the uplink message (e.g., an uplink random access message in two-step RACH). In some cases, the range of payload sizes is configurable. For instance, $L_{max}$, $L_{min}$, or both may depend on a cell identifier (e.g., the cell identifier of the cell a UE is operating within), the random access procedure type (e.g., CBRA or CFRA), the transmission occasion within a cell when the uplink message is sent, or a combination thereof.

After determining or identifying the threshold, the UE 115 may compare a size of the payload L to the threshold $L_0$. If L G $L_0$, the UE 115 may pad a number of bits (e.g., $L_0$–L) until L=$L_0$. Alternatively, if L>$L_0$, the UE 115 may add the $C_1$ CRC bits to the payload and may segment the (L+$C_1$) bits into (L+$C_1$)/$L_0$ CBs. If (L+$C_1$)/$L_0$, is not an integer, (L+$C_1$)–$L_0$(L+$C_1$/$L_0$)–1 bits may be padded onto one of the CBs (e.g., the last CB). Each of the CBs in combination may be considered to be a CBG. Upon segmenting the payload into CBs, the UE 115 may attach $C_2$ CRC bits to each CB, where $C_2$ may also be a configurable value.

Additionally, at 505, the UE 115 may perform channel coding and/or rate matching. For instance, with regards to channel coding, the UE 115 may select a channel coding scheme which may encode each of the CBs. For instance, the UE 115 may apply a linear code or a convolutional code.

With regards to rate matching, the UE 115 may pad or puncture a number of bits from each CB.

At 510, the UE 115 may perform bit-level scrambling for the CBG. Generally, the CBG may be scrambled by a scrambling ID. In some cases, the scrambling ID generation may be UE-specific and/or cell-specific and may be function of a preamble resource ID of an uplink random access transmission, CBG size, PRU resource index, DMRS resource index, or a combination thereof. By making the scrambling ID generation UE-specific, the UE 115 may randomize the intra-cell interference. Additionally or alternatively, by making the scrambling ID generation cell-specific, the UE 115 may randomize the inter-cell interference.

At 515, the UE 115 may perform linear modulation (e.g., amplitude modulation) for the CBG. At 520, the UE 115 may perform transform precoding for the CBG. At 525, the UE 115 may perform an inverse fast fourier transform (IFFT) for the CBG.

At 530, the UE 115 may multiplex each CB of the CBG with a respective DMRS resource from 540 and a preamble of the uplink message 205. In some cases, to indicate CBG configuration (e.g., CBG size, CBG-to-PRU mapping, or both), the CBG may also be multiplexed with uplink control information (UCI), which may be referred to as piggybacking.

In some cases, the CBG configuration may, additionally or alternatively, be indicated by the preamble via preamble partitioning. For instance, a pool of preamble sequences and a random access occasion (RO) index may be partitioned into multiple groups. The preamble resource in different groups may be associated with one or multiple CBG sizes and one or multiple CBG-to-PRU mapping decisions. At 545, the UE 115 may select a preamble resource index $Index_{preamble\_resource}$ according to the CBG size and/or CBG-to-PRU mapping associated with the uplink message 205 and may determine the preamble at 550 based on the selected preamble resource index $Index_{preamble\_resource}$. In general, the preamble resource index $Index_{preamble\_resource}$ may be a function of preamble sequence index $Index_{preamble\_sequence}$ and RO index $Index_{RO}$. For instance, $Index_{preamble\_resource} = Index_{preamble\_sequence} + Q*Index_{RO}$, where $0 \leq Index_{preamble\_sequence} \leq 63$ and Q may be a scaling constant greater than the pool size of preamble sequences for the uplink message 205 (e.g., Q=128, 256).

At 555, the UE 115 may perform CBG-to-PRU mapping, such as described with reference to FIGS. 3A, 3B, and 3C and may transmit the uplink message 205.

Figure 6:
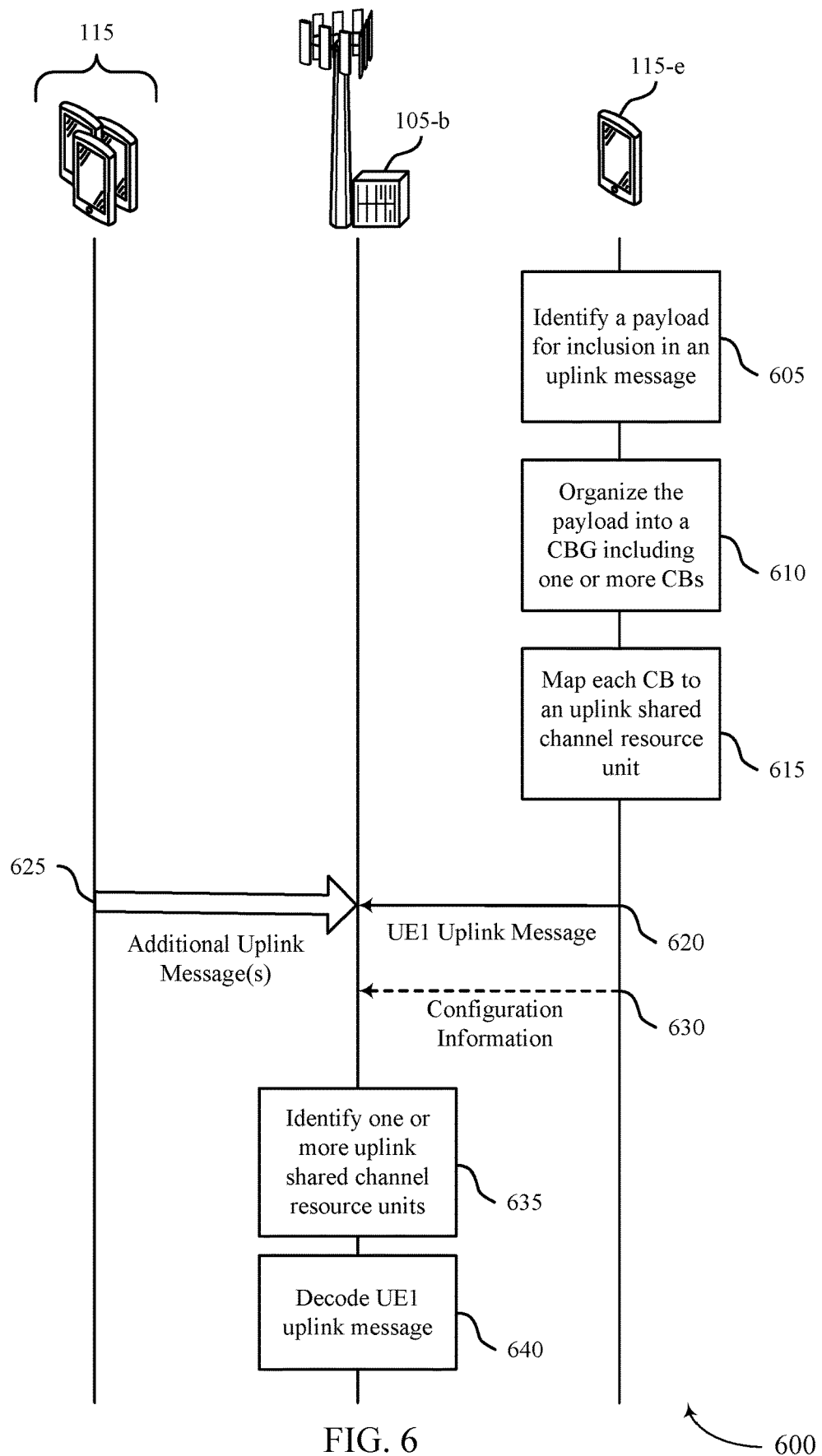
FIG. 6 illustrates an example of a process flow that supports CBG based multiplexing (e.g., in two-step random access procedures or uplink transmissions) in accordance with aspects of the present disclosure.

FIG. 6 illustrates an example of a process flow 600 that supports CBG based multiplexing (e.g., in two-step random access procedures or uplink transmissions) in accordance with aspects of the present disclosure. In some examples, process flow 600 may implement aspects of wireless communications system 100. For instance, process flow 600 may include base station 105-*b* and UE 115-*e*, which may be examples of a base station 105 and a UE 115, respectively, as described with reference to FIG. 1.

At 605, UE 115-*e* may identify a payload for inclusion in an uplink message. For example, the uplink message may be an uplink random access message of a two-step random access procedure (e.g., MsgA) or may be an uplink configured grant (e.g., a configured grant Type 1 or Type2 PUSCH transmission).

At 610, UE 115-*e* may organize the payload into a CBG that includes one or more CBs. In some cases, organizing the payload into a CBG may involve UE 115-*e* determining a payload segmentation threshold (e.g., $L_0$); comparing a size of the payload (e.g., L) to the payload segmentation threshold; and organizing the payload into the CBG based on the comparing. In some cases, the payload segmentation threshold may be based on a minimum payload size (e.g., $L_{min}$), a maximum payload size (e.g., $L_{max}$), a number of error checking bits attached to the payload (e.g., $C_1$), or a combination thereof.

In some cases, during the comparing, UE 115-*e* may determine that the size of the payload is smaller than the payload segmentation threshold. In such cases, UE 115-*e* may pad one or more bits of the payload (e.g., $L_0$–L bits). Alternatively, during the comparing, UE 115-*a* may determine that a size of the payload is larger than the payload segmentation threshold based on the comparing. In such cases, UE 115-*e* may attach a set of error checking bits to the payload (e.g., $C_1$ bits) and may segment the payload into a set of CBs including each CB of the CBG after attaching the error checking bits to the payload. In some cases, at least one of the CBs (e.g., the last one) may be padded with one or more bits (e.g., if the segmenting would not produce CBs of uniform size). If a size of the payload is equal to the payload segmentation threshold, the payload may not be padded or segmented. In some cases, UE 115-*e* may organize the payload into the CBG based on an identified minimum payload size (e.g., $L_{min}$) and an identified maximum payload size (e.g., $L_{max}$), which may either or both be based on a cell ID, a random access procedure type (e.g., CBRA versus CFRA), a transmission occasion number (e.g., an index corresponding to a transmission occasion), or a combination thereof.

In some cases, UE 115-*e* may select a channel coding scheme to encode each CB of the CBG (e.g., convolutional or linear coding scheme) and may encode each CB of the CBG according to the selected channel coding scheme. In some cases, UE 115-*e* may scramble the CBG at a bit level according to a scrambling ID, which may be UE-specific and may be based on a preamble resource ID (e.g., $Index_{preamble\_resource}$), a CBG size, a reference signal resource index (e.g., a DMRS resource index), an uplink shared channel resource unit index (e.g., a PRU index), or a combination thereof. In some cases, a size of the CBG is based on ra range of a size of the payload ($L_{min}$ to $L_{max}$), a random access procedure type (e.g., CBRA versus CFRA), a system bandwidth, system loading, a transmission occasion number, or a combination thereof.

In some cases, UE 115-*e* may multiplex each corresponding uplink shared channel resource unit with a resource of a reference signal, such as a DMRS. The configuration of the resource of the reference signal may be based on a number of symbols spanned by the DMRS, a number of RBs or sub-PRBs spanned by the DMRS, an index of antenna port associated with the DMRS, a DMRS sequence, a mapping type, an OCC, a precoding or beamforming index associated with the DMRS index, or a combination thereof.

At 615, UE 115-*e* may map each CB of the CBG to a corresponding uplink shared channel resource unit (e.g., a PRU) of an uplink transmission occasion. The uplink transmission occasion may be shared by UE 115-*a* with one or more additional UEs 115 such that the CBG of the first UE is multiplexed with additional CBGs from the additional UEs 115. If the uplink message is sent as part of CFRA, UE 115-*b* may receive signaling (e.g., DCI, RRC, MAC CE) from base station 105-*e* indicating a resource mapping and may map the CBs to the corresponding uplink shared channel resource unit based on the indicated resource mapping. Alternatively, if the uplink message is sent as part of CBRA, UE 115-*e* may receive signaling (e.g., SI signaling, RRC signaling, or both) indicating a set of rules or options for performing resource mapping for the uplink message and may perform the mapping according to the set of rules or options. In some cases, the set of rules may indicate to perform the resource mapping randomly within a configured pool of resources.

In some cases, the configuration of each uplink shared resource unit may be based on a number of symbols spanned by a corresponding uplink shared channel resource, a number of resource blocks or sub-physical-resource-blocks (sub-PRBs) spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof. In some cases, the corresponding uplink shared channel resource may be a PUSCH resource.

In some cases, the corresponding uplink shared channel resource units may include a first uplink shared channel resource unit associated with a first CB of the CBG and a second uplink shared channel resource unit associated with a second CB of the CBG. In some cases, the first uplink shared channel resource unit and the second uplink shared channel resource unit may overlap in time, frequency, space, or a combination thereof. For instance, the first and second uplink shared channel resource units may overlap in time and be contiguous in frequency. Alternatively, the first and second uplink shared channel resource units may overlap in frequency and be contiguous in time. Alternatively, the first and second uplink shared channel resource units may be disjoint in time and frequency.

At 620, UE 115-*e* may transmit, to base station 105-*b*, the uplink message including each uplink shared channel resource unit on which the CBG is organized.

At 625, one or more additional UEs 115 may transmit, during the uplink transmission occasion, additional uplink messages multiplexed across the set of uplink shared channel resource with the first uplink message.

At 630, UE 115-*e* may transmit configuration information for the CBG to base station 105-*b*. Such configuration information may include a size of the CBG, a mapping from each CB to the corresponding uplink shared channel resource unit (e.g., PRU), or both. In some cases, transmitting the configuration information may involve UE 115-*e* identifying a preamble associated with the uplink message; determining a preamble resource ID (e.g., $Index_{preamble\_resource}$) for the preamble based on the configuration information; and transmitting the preamble with the preamble resource ID. Additionally, in some cases, UE 115-*e* may identify a set of preamble sequence indices (e.g., a set of $Index_{preamble\_sequence}$ values) and a set of random access occasion (RO) indices (e.g., a set of $Index_{RO}$ values); may partition the set of preamble sequence indices into multiple subsets of preamble sequence indices and the set of RO indices into multiple subsets of RO indices based on configuration information; and may determine the preamble resource ID based on the partitioning. Additionally or alternatively, UE 115-*e* may multiplex UCI associated with or indicating the configuration information with at least one of the uplink shared channel resource units.

At 635, base station 105-*e* may identify the one or more uplink shared channel resource units associated with uplink message of UE 115-*e*. The one or more uplink shared channel resource units may include a corresponding CB of a first CBG that include the uplink message of UE 115-*e*.

At 640, base station 105-*e* may decode the uplink message of UE 115-*e* by decoding the one or more uplink shared channel resource units of the uplink message of UE 115-*e*.

Figure 7:
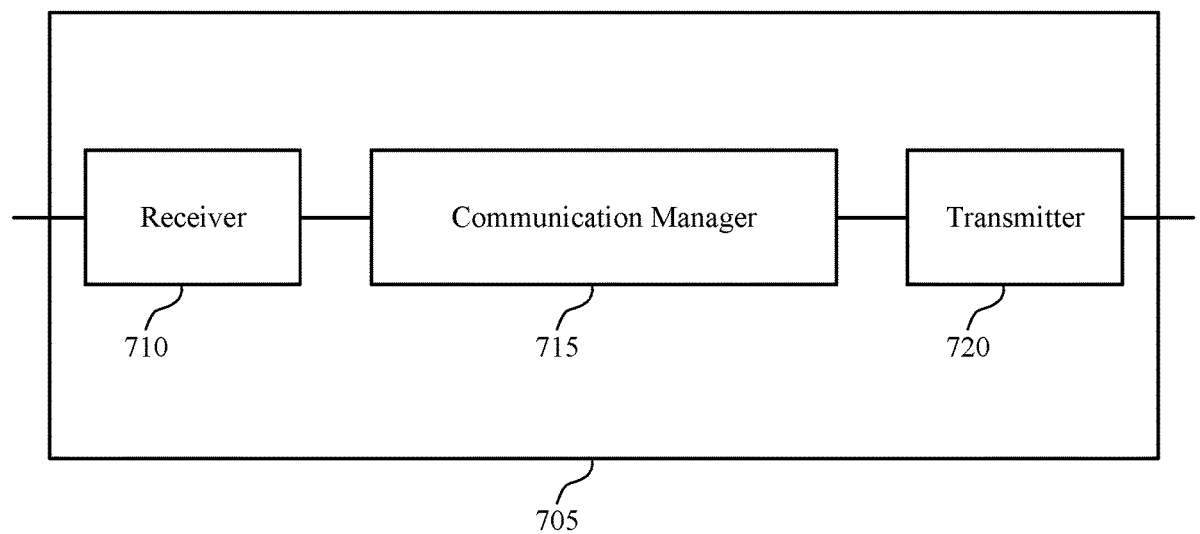
FIGS. 7 and 8 show block diagrams of devices that support CBG based multiplexing (e.g., in two-step random access procedures or uplink transmissions) in accordance with aspects of the present disclosure.

FIG. 7 shows a block diagram 700 of a device 705 that supports CBG based multiplexing (e.g., in two-step random access procedures or uplink transmissions) in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to CBG based multiplexing in two-step RACH, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may identify a payload for inclusion by the first UE in an uplink message, organize the payload into a CBG that includes one or more code blocks, map each code block of the CBG to a corresponding uplink shared channel resource unit of an uplink transmission occasion shared by the first UE with one or more additional UEs such that the CBG of the first UE is multiplexed with additional CBG s from the additional UEs, and transmit, to a base station, the uplink message including each uplink shared channel resource unit on which the CBG is organized. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
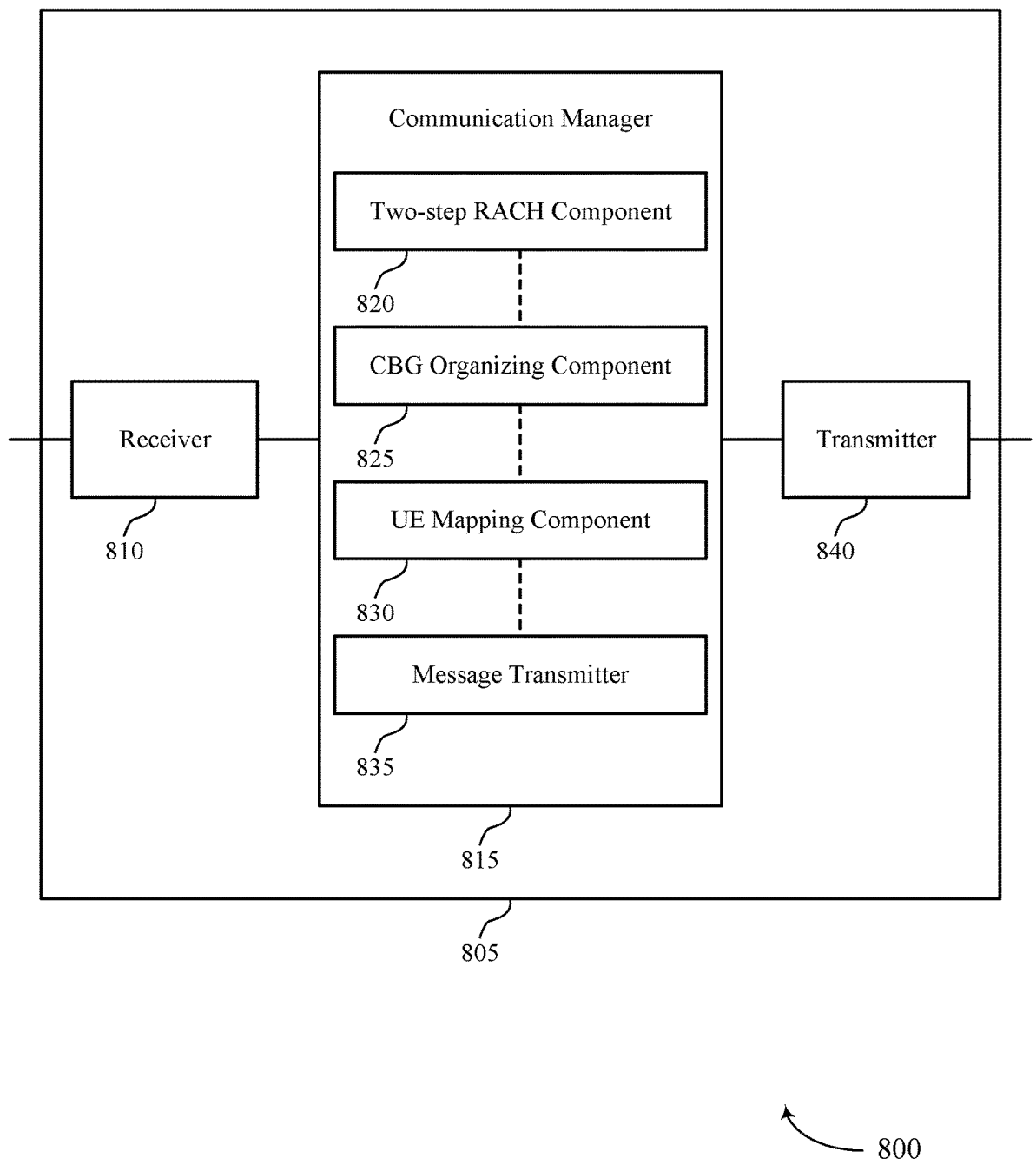

FIG. 8 shows a block diagram 800 of a device 805 that supports CBG based multiplexing (e.g., in two-step random access procedures or uplink transmissions) in accordance with aspects of the present disclosure. The device 805 may be an example of aspects of a device 705, or a UE 115 as described herein. The device 805 may include a receiver 810, a communication manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to CBG based multiplexing in two-step RACH, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a two-step RACH component 820, a CBG organizing component 825, an UE mapping component 830, and a message transmitter 835. The communication manager 815 may be an example of aspects of the communication manager 1010 described herein.

The two-step RACH component 820 may identify a payload for inclusion by the first UE in an uplink random access message of a two-step random access procedure.

The CBG organizing component 825 may organize the payload into a CBG that includes one or more code blocks.

The UE mapping component 830 may map each code block of the CBG to a corresponding uplink shared channel resource unit of an uplink transmission occasion shared by the first UE with one or more additional UEs such that the CBG of the first UE is multiplexed with additional CBG s from the additional UEs.

The message transmitter 835 may transmit, to a base station, the uplink message including each uplink shared channel resource unit on which the CBG is organized.

The transmitter 840 may transmit signals generated by other components of the device 805. In some examples, the transmitter 840 may be collocated with a receiver 810 in a transceiver module. For example, the transmitter 840 may be an example of aspects of the transceiver 1015 described with reference to FIG. 10. The transmitter 840 may utilize a single antenna or a set of antennas.

Figure 9:
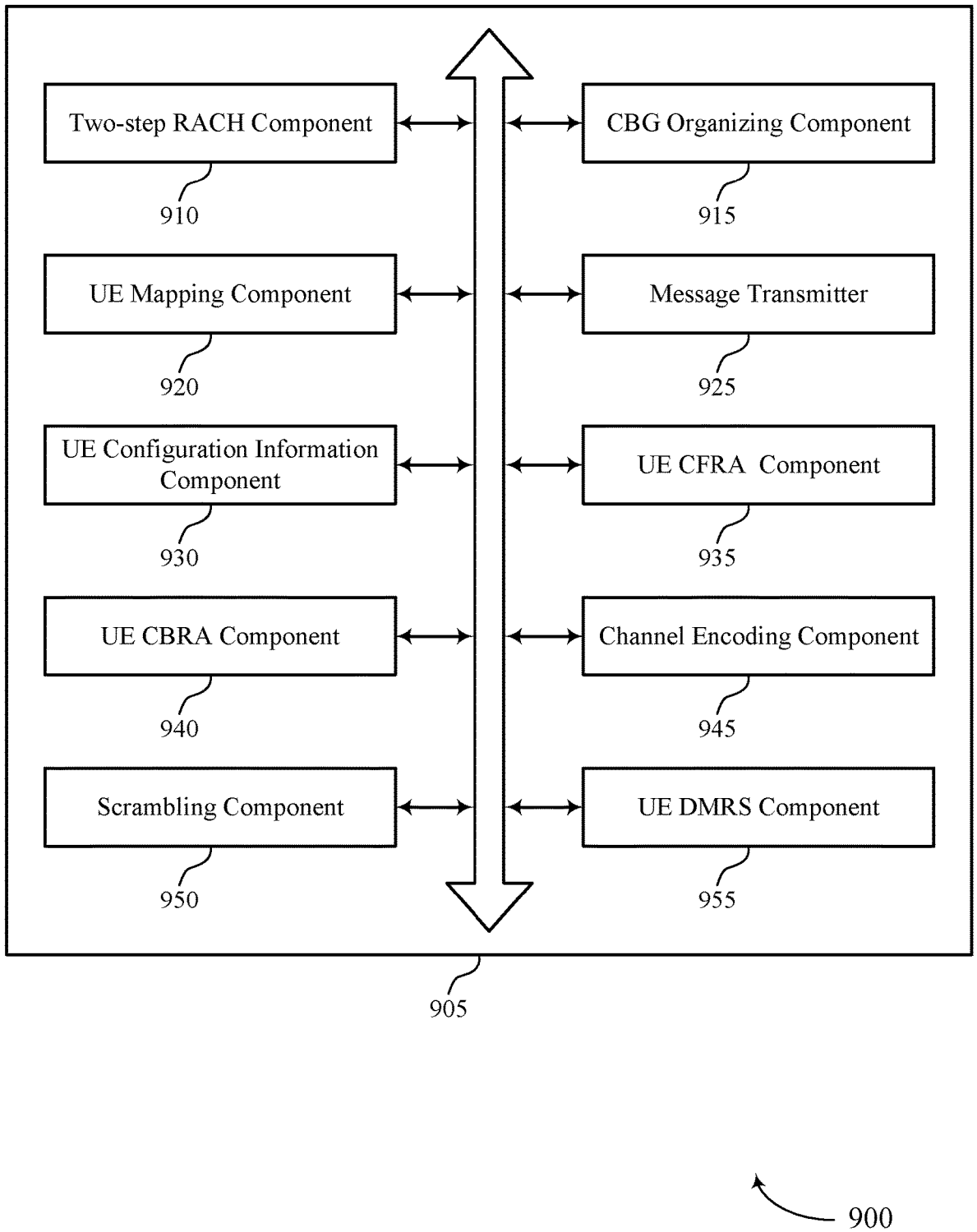
FIG. 9 shows a block diagram of a communication manager that supports CBG based multiplexing (e.g., in two-step random access procedures or uplink transmissions) in accordance with aspects of the present disclosure.

FIG. 9 shows a block diagram 900 of a communication manager 905 that supports CBG based multiplexing (e.g., in two-step random access procedures or uplink transmissions) in accordance with aspects of the present disclosure. The communication manager 905 may be an example of aspects of a communication manager 715, a communication manager 815, or a communication manager 1010 described herein. The communication manager 905 may include a two-step RACH component 910, a CBG organizing component 915, an UE mapping component 920, a message transmitter 925, an UE configuration information component 930, an UE CFRA component 935, an UE CBRA component 940, a channel encoding component 945, a scrambling component 950, and an UE DMRS component 955. Each of these modules may communicate, directly or indirectly, with one another (e.g., via one or more buses).

The two-step RACH component 910 may identify a payload for inclusion by the first UE in an uplink random access message of a two-step random access procedure.

The CBG organizing component 915 may organize the payload into a CBG that includes one or more code blocks. In some examples, the CBG organizing component 915 may determine a payload segmentation threshold. In some examples, the CBG organizing component 915 may compare a size of the payload to the payload segmentation threshold. In some examples, the CBG organizing component 915 may organize the payload into the CBG based on the comparing. In some examples, the CBG organizing component 915 may determine that a size of the payload is smaller than the payload segmentation threshold based on the comparing. In some examples, the CBG organizing component 915 may pad one or more bits to the payload based on determining that the size of the payload is smaller than the payload segmentation threshold. In some examples, the CBG organizing component 915 may determine that a size of the payload is larger than the payload segmentation threshold based on the comparing. In some examples, the CBG organizing component 915 may attach a set of error checking bits to the payload. In some examples, the CBG organizing component 915 may segment the payload into a set of code blocks including each code block of the CBG after attaching the set of error checking bits to the payload and based on determining that the size of the payload is larger than the payload segmentation threshold. In some examples, the CBG organizing component 915 may pad at least one of the set of code blocks with one or more bits based on the segmenting. In some examples, the CBG organizing component 915 may attach a second set of error checking bits to each of the set of code blocks. In some examples, the CBG organizing component 915 may identify a minimum payload size and a maximum payload size. In some examples, the CBG organizing component 915 may organize the payload into the CBG based on the minimum payload size and the maximum payload size.

The UE mapping component 920 may map each code block of the CBG to a corresponding uplink shared channel resource unit of an uplink transmission occasion shared by the first UE with one or more additional UEs such that the CBG of the first UE is multiplexed with additional CBG s from the additional UEs.

The message transmitter 925 may transmit, to a base station, the uplink message including each uplink shared channel resource unit on which the CBG is organized.

The UE configuration information component 930 may provide an indication of configuration information for the CBG to the base station. In some examples, the UE configuration information component 930 may identify a preamble associated with the uplink message (e.g., where the uplink message is an uplink random access message). In some examples, the UE configuration information component 930 may determine a preamble resource identifier for the preamble based on the configuration information. In some examples, the UE configuration information component 930 may transmit the preamble with the preamble resource identifier. In some examples, the UE configuration information component 930 may identify a set of preamble sequence indices and a set of random access occasion indices. In some examples, the UE configuration information component 930 may partition the set of preamble sequence indices into a set of subsets of preamble sequence indices and the set of random access occasion indices into a set of subsets of random access occasion indices based on the configuration information. In some examples, the UE configuration information component 930 may determine the preamble resource identifier based on the partitioning. In some examples, the UE configuration information component 930 may multiplex UCI associated with the configuration information with at least one of the uplink shared channel resource units. In some cases, the configuration information includes a size of the CBG, an indication of the mapping from each code block to the corresponding uplink shared channel resource unit, or a combination thereof.

The UE CFRA component 935 may determine to transmit the uplink message as part of a contention-free random access procedure. In some examples, the UE CFRA component 935 may receive signaling from the base station indicating a resource mapping. In some examples, the UE CFRA component 935 may map each code block to the corresponding uplink shared channel resource unit based on the resource mapping. In some cases, the signaling includes DCI signaling, RRC signaling, or a combination thereof.

The UE CBRA component 940 may determine to transmit the uplink message as part of a contention-based random access procedure. In some examples, the UE CBRA component 940 may receive signaling indicating a set of rules for performing resource mapping for the uplink message. In some examples, the UE CBRA component 940 may map each code block to the corresponding uplink shared channel resource unit based on the set of rules. In some cases, the signaling includes system information signaling, RRC signaling, or a combination thereof.

The channel encoding component 945 may select a channel coding scheme to encode each code block of the CBG. In some examples, the channel encoding component 945 may encode each code block of the CBG according to the selected channel coding scheme.

The scrambling component 950 may scramble the CBG at a bit level according to a scrambling identifier.

The UE DMRS component 955 may multiplex each corresponding uplink shared channel resource unit with a resource of a reference signal.

Figure 10:
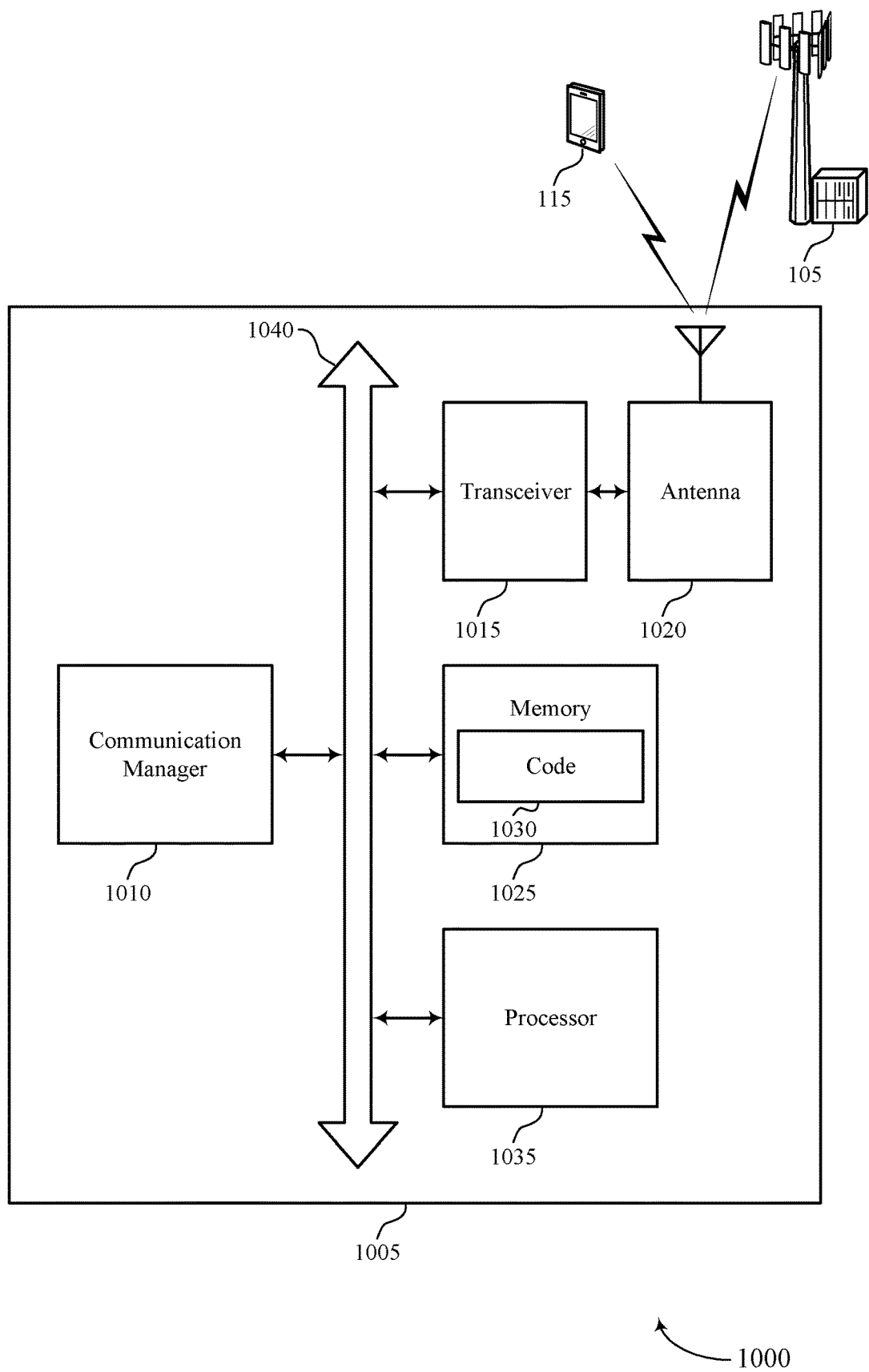
FIG. 10 shows a diagram of a system including a device that supports CBG based multiplexing (e.g., in two-step random access procedures or uplink transmissions) in accordance with aspects of the present disclosure.

FIG. 10 shows a diagram of a system 1000 including a device 1005 that supports CBG based multiplexing (e.g., in two-step random access procedures or uplink transmissions) in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may identify a payload for inclusion by the first UE in an uplink message, organize the payload into a CBG that includes one or more code blocks, map each code block of the CBG to a corresponding uplink shared channel resource unit of an uplink transmission occasion shared by the first UE with one or more additional UEs such that the CBG of the first UE is multiplexed with additional CBG s from the additional UEs, and transmit, to a base station, the uplink message including each uplink shared channel resource unit on which the CBG is organized.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting CBG based multiplexing in two-step RACH).

Figure 11:
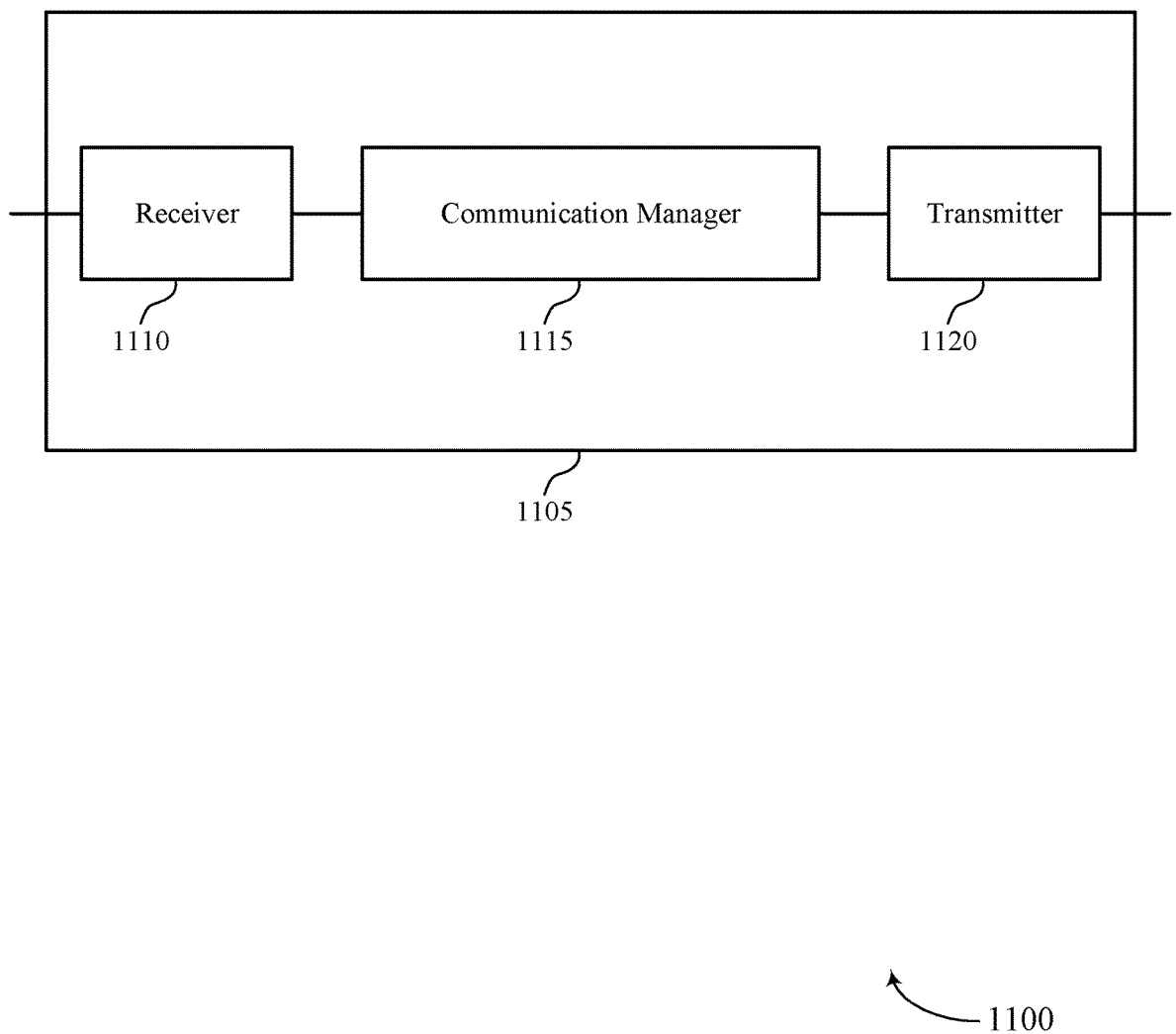
FIGS. 11 and 12 show block diagrams of devices that support CBG based multiplexing (e.g., in two-step random access procedures or uplink transmissions) in accordance with aspects of the present disclosure.

FIG. 11 shows a block diagram 1100 of a device 1105 that supports CBG based multiplexing (e.g., in two-step random access procedures or uplink transmissions) in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to CBG based multiplexing in two-step RACH, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may receive, from a first UE and during an uplink transmission occasion that includes a set of uplink shared channel resource units, a first uplink message, receive, from one or more additional UEs and during the uplink transmission occasion, additional uplink messages multiplexed across the set of uplink shared channel resource units with the first uplink message, identify one or more first uplink shared channel resource units of the set of uplink shared channel resource units, the one or more first uplink shared channel resource units each including a corresponding code block of a first CBG that includes the first uplink message, and decode the first uplink message by decoding the one or more first uplink shared channel resource units. The communication manager 1115 may be an example of aspects of the communication manager 1410 described herein.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
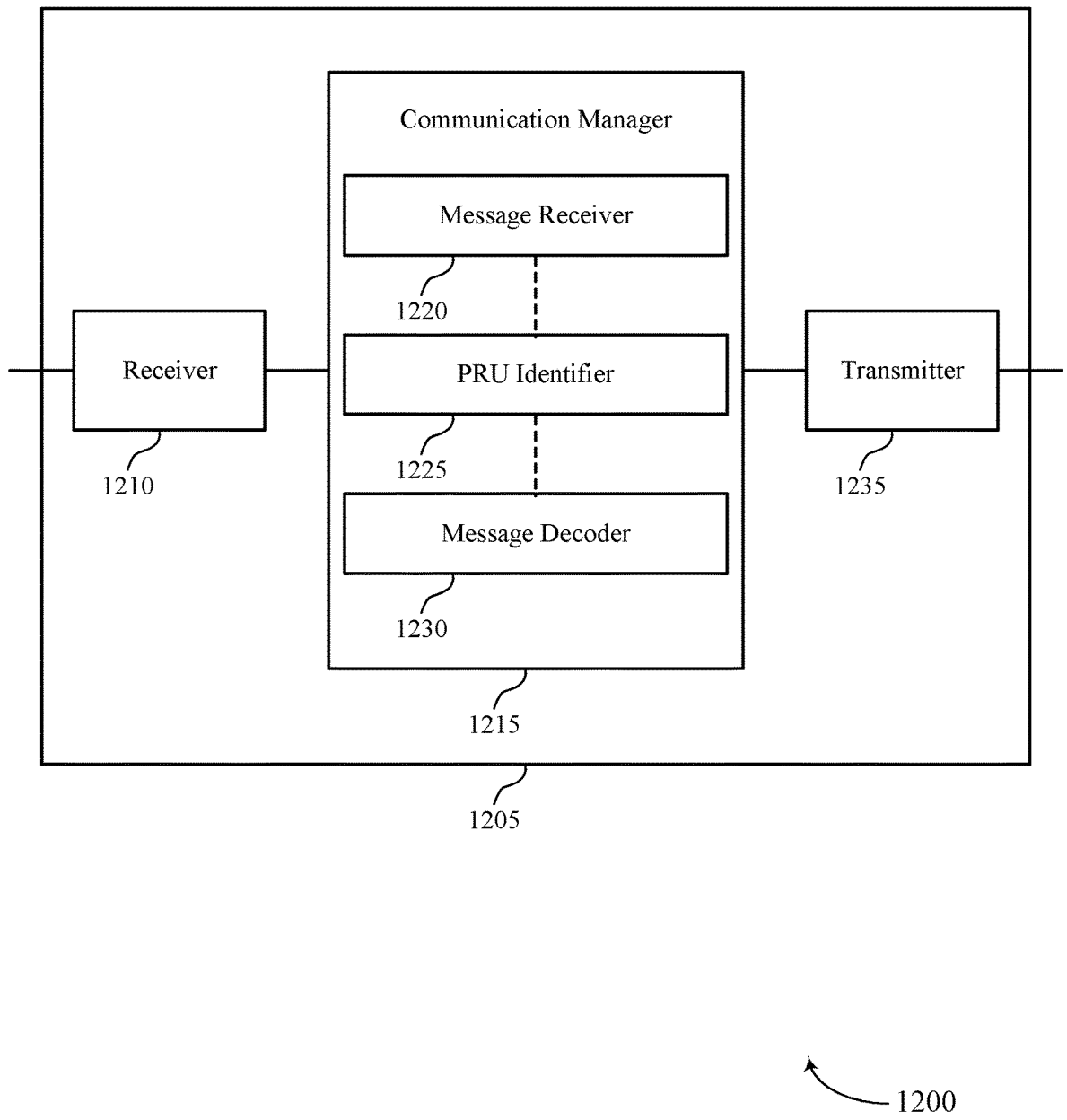

FIG. 12 shows a block diagram 1200 of a device 1205 that supports CBG based multiplexing (e.g., in two-step random access procedures or uplink transmissions) in accordance with aspects of the present disclosure. The device 1205 may be an example of aspects of a device 1105, or a base station 105 as described herein. The device 1205 may include a receiver 1210, a communication manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to CBG based multiplexing in two-step RACH, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a message receiver 1220, a PRU identifier 1225, and a message decoder 1230. The communication manager 1215 may be an example of aspects of the communication manager 1410 described herein.

The message receiver 1220 may receive, from a first UE and during an uplink transmission occasion that includes a set of uplink shared channel resource units, a first uplink message and receive, from one or more additional UEs and during the uplink transmission occasion, additional uplink messages multiplexed across the set of uplink shared channel resource units with the first uplink message.

The PRU identifier 1225 may identify one or more first uplink shared channel resource units of the set of uplink shared channel resource units, the one or more first uplink shared channel resource units each including a corresponding code block of a first CBG that includes the first uplink message.

The message decoder 1230 may decode the first uplink message by decoding the one or more first uplink shared channel resource units.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
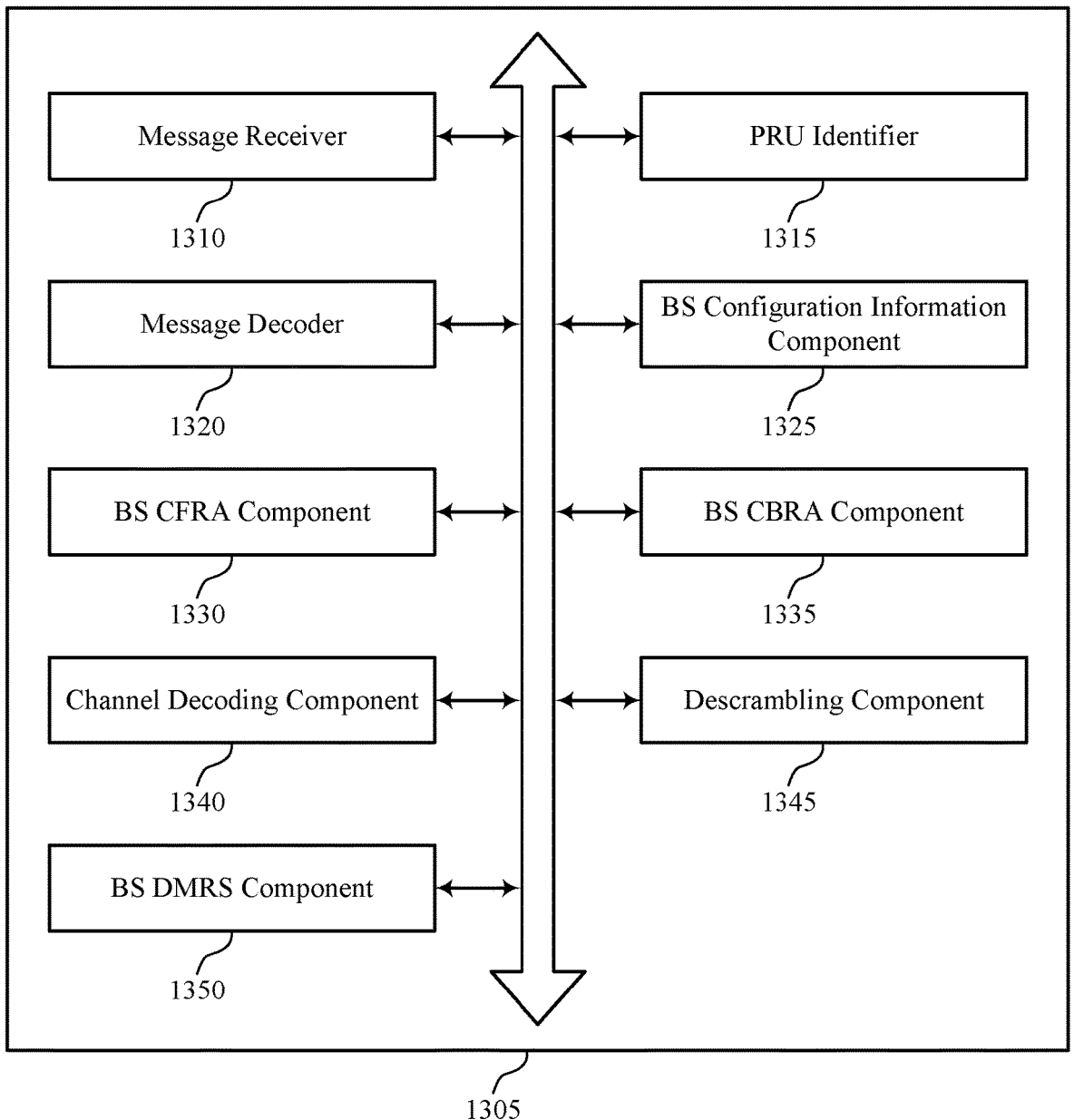
FIG. 13 shows a block diagram of a communication manager that supports CBG based multiplexing (e.g., in two-step random access procedures or uplink transmissions) in accordance with aspects of the present disclosure.

FIG. 13 shows a block diagram 1300 of a communication manager 1305 that supports CBG based multiplexing (e.g., in two-step random access procedures or uplink transmissions) in accordance with aspects of the present disclosure. The communication manager 1305 may be an example of aspects of a communication manager 1115, a communication manager 1215, or a communication manager 1410 described herein. The communication manager 1305 may include a message receiver 1310, a PRU identifier 1315, a message decoder 1320, a BS configuration information component 1325, a BS CFRA component 1330, a BS CBRA component 1335, a channel decoding component 1340, a descrambling component 1345, and a BS DMRS component 1350. Each of these modules may communicate, directly or indirectly, with one another (e.g., via one or more buses).

The message receiver 1310 may receive, from a first UE and during an uplink transmission occasion that includes a set of uplink shared channel resource units, a first uplink message.

In some examples, the message receiver 1310 may receive, from one or more additional UEs and during the uplink transmission occasion, additional uplink messages multiplexed across the set of uplink shared channel resource units with the first uplink message.

The PRU identifier 1315 may identify one or more first uplink shared channel resource units of the set of uplink shared channel resource units, the one or more first uplink shared channel resource units each including a corresponding code block of a first CBG that includes the first uplink message.

The message decoder 1320 may decode the first uplink message by decoding the one or more first uplink shared channel resource units. In some examples, the message decoder 1320 may identify a set of error checking bits attached to each corresponding code block. In some examples, the message decoder 1320 may decode the first uplink message based on the set of error checking bits attached to each corresponding code block. In some examples, the message decoder 1320 may organize each corresponding code block together into a payload. In some examples, the message decoder 1320 may identify a set of error checking bits attached to the payload. In some examples, the message decoder 1320 may decode the first uplink message based on the set of error checking bits attached to the payload. In some examples, the message decoder 1320 may identify a minimum payload size and a maximum payload size. In some examples, the message decoder 1320 may decode the first uplink message based on the minimum payload size and the maximum payload size.

The BS configuration information component 1325 may receive an indication of configuration information for the first CBG from the first UE. In some examples, the BS configuration information component 1325 may receive a preamble associated with the first uplink message (e.g., where the first uplink message is a first uplink random access message). In some examples, the BS configuration information component 1325 may determine a preamble resource identifier for the preamble. In some examples, the BS configuration information component 1325 may identify the configuration information for the first code block group based on the preamble resource identifier. In some examples, the BS configuration information component 1325 may identify a set of preamble sequence indices and a set of random access occasion indices. In some examples, the BS configuration information component 1325 may partition the set of preamble sequence indices into a set of subsets of preamble sequence indices and the set of random access occasion indices into a set of subsets of random access occasion indices based on the configuration information. In some examples, the BS configuration information component 1325 may identify the configuration information based on the partitioning. In some examples, the BS configuration information component 1325 may identify UCI multiplexed with at least one of the one or more first uplink shared channel resource units. In some examples, the BS configuration information component 1325 may decode the UCI. In some examples, the BS configuration information component 1325 may determine the configuration information for the first code block group based on decoding the UCI. In some cases, the configuration information includes a size of the first CBG, an indication of the mapping from each code block to the corresponding uplink shared channel resource unit, or a combination thereof.

The BS CFRA component 1330 may transmit signaling to the first UE indicating a resource mapping. In some examples, the BS CFRA component 1330 may receive the first uplink message as part of a contention free random access procedure based on transmitting the signaling indicating the resource mapping. In some cases, the signaling includes DCI signaling, RRC signaling, or a combination thereof.

The BS CBRA component 1335 may transmit signaling indicating a set of rules for performing resource mapping. In some examples, the BS CBRA component 1335 may receive the first uplink message from the first UE as part of a contention-based random access procedure based on transmitting the signaling indicating the set of rules. In some cases, the signaling includes system information signaling, RRC signaling, or a combination thereof.

The channel decoding component 1340 may select a channel decoding scheme to decode each corresponding code block. In some examples, the channel decoding component 1340 may decode each corresponding code block according to the selected channel decoding scheme.

The descrambling component 1345 may descramble the first CBG at a bit level according to a scrambling identifier.

The BS DMRS component 1350 may identify, for each of the one or more first uplink shared channel resource units, a resource of a reference signal. In some examples, the BS DMRS component 1350 may decode the first uplink message based on identifying the resource of the reference signal for each of the one or more first uplink shared channel resource units.

Figure 14:
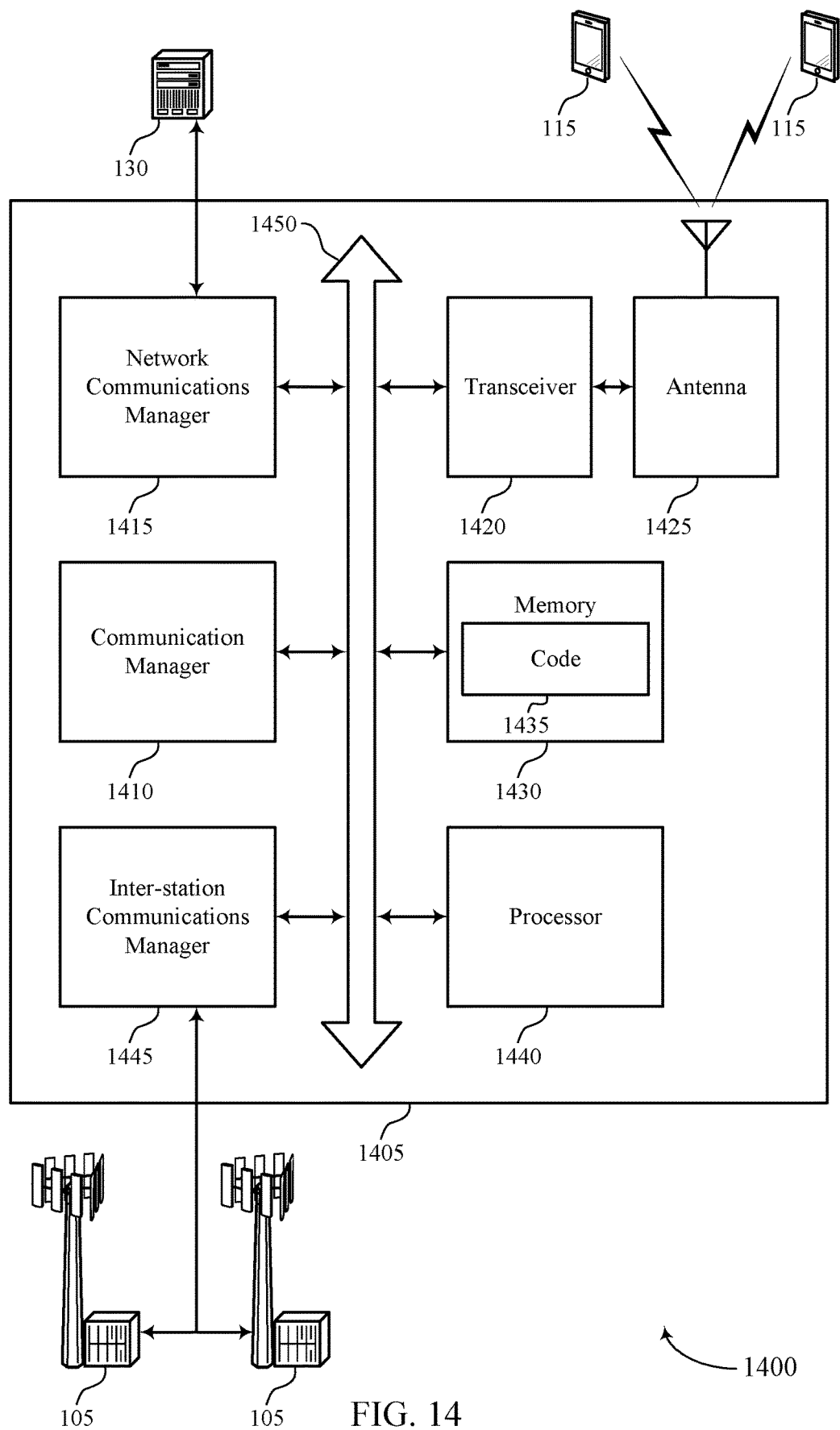
FIG. 14 shows a diagram of a system including a device that supports CBG based multiplexing (e.g., in two-step random access procedures or uplink transmissions) in accordance with aspects of the present disclosure.

FIG. 14 shows a diagram of a system 1400 including a device 1405 that supports CBG based multiplexing (e.g., in two-step random access procedures or uplink transmissions) in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may receive, from a first UE and during an uplink transmission occasion that includes a set of uplink shared channel resource units, a first uplink message, receive, from one or more additional UEs and during the uplink transmission occasion, additional uplink messages multiplexed across the set of uplink shared channel resource units with the first uplink message, identify one or more first uplink shared channel resource units of the set of uplink shared channel resource units, the one or more first uplink shared channel resource units each including a corresponding code block of a first CBG that includes the first uplink message, and decode the first uplink message by decoding the one or more first uplink shared channel resource units.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting CBG based multiplexing in two-step RACH).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
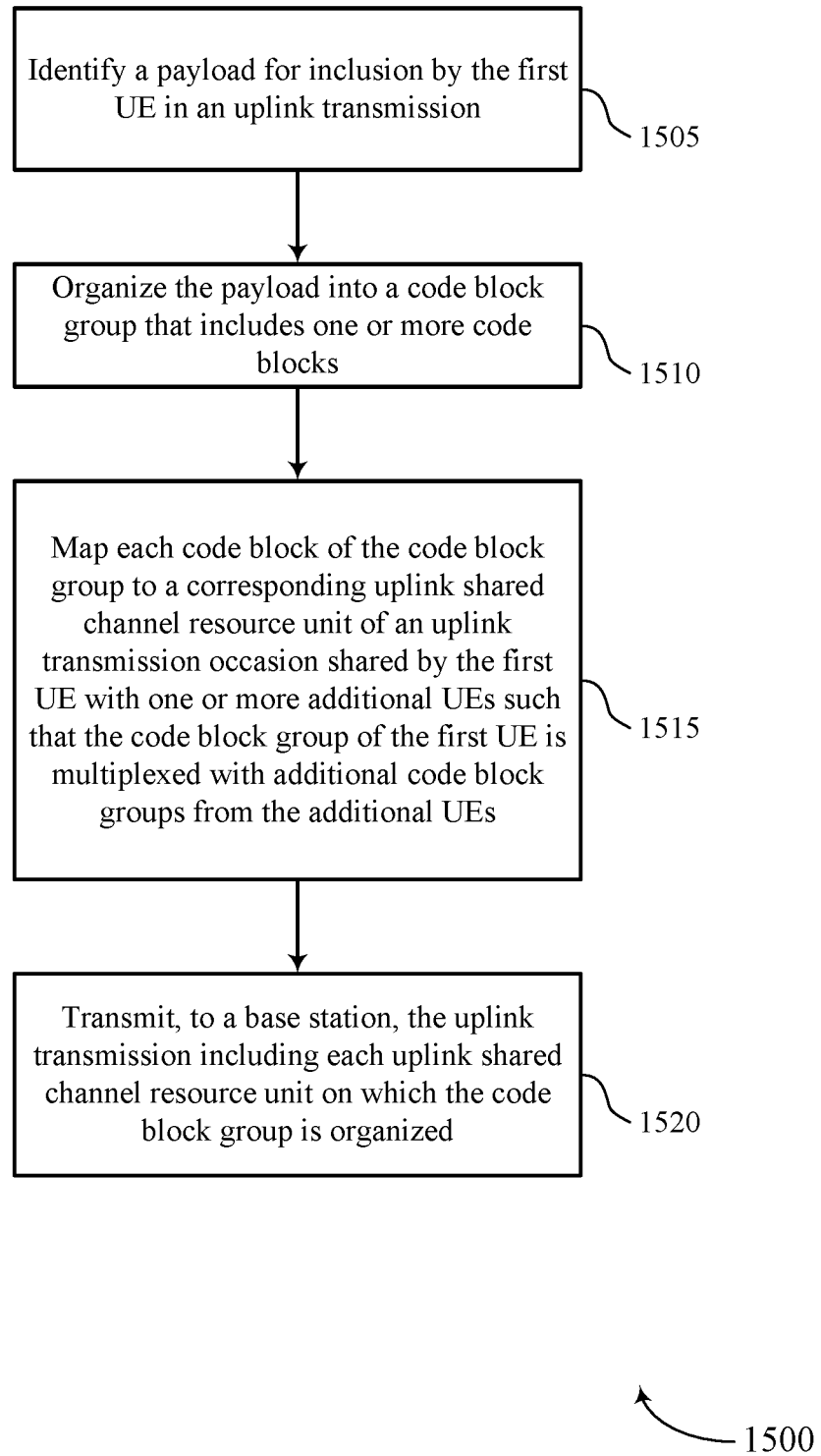
FIGS. 15 through 18 show flowcharts illustrating methods that support CBG based multiplexing (e.g., in two-step random access procedures or uplink transmissions) in accordance with aspects of the present disclosure.

FIG. 15 shows a flowchart illustrating a method 1500 that supports code block group based multiplexing (e.g., in two-step random access procedures or uplink transmissions) in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may identify a payload for inclusion by the first UE in an uplink transmission. The operations of 1505 may be performed according to the methods described herein. In some examples, aspects of the operations of 1505 may be performed by a two-step RACH component as described with reference to FIGS. 7 through 10.

At 1510, the UE may organize the payload into a code block group that includes one or more code blocks. The operations of 1510 may be performed according to the methods described herein. In some examples, aspects of the operations of 1510 may be performed by a CBG organizing component as described with reference to FIGS. 7 through 10.

At 1515, the UE may map each code block of the code block group to a corresponding uplink shared channel resource unit of an uplink transmission occasion shared by the first UE with one or more additional UEs such that the code block group of the first UE is multiplexed with additional code block groups from the additional UEs. The operations of 1515 may be performed according to the methods described herein. In some examples, aspects of the operations of 1515 may be performed by a UE mapping component as described with reference to FIGS. 7 through 10.

At 1520, the UE may transmit, to a base station, the uplink transmission including each uplink shared channel resource unit on which the code block group is organized. The operations of 1520 may be performed according to the methods described herein. In some examples, aspects of the operations of 1520 may be performed by a message transmitter as described with reference to FIGS. 7 through 10.

Figure 16:
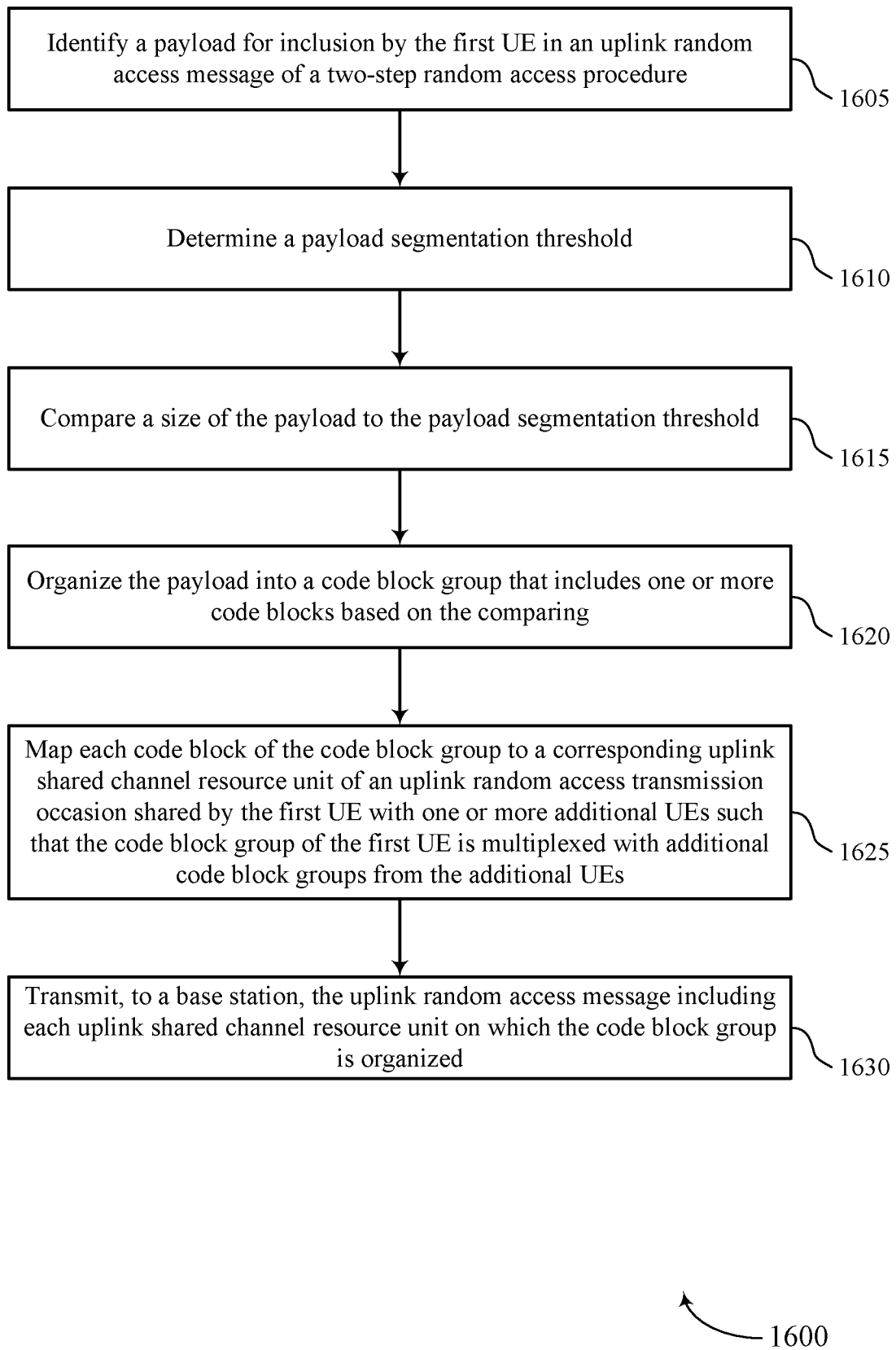

FIG. 16 shows a flowchart illustrating a method 1600 that supports code block group based multiplexing in two-step random access procedures in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may identify a payload for inclusion by the first UE in an uplink random access message of a two-step random access procedure. The operations of 1605 may be performed according to the methods described herein. In some examples, aspects of the operations of 1605 may be performed by a two-step RACH component as described with reference to FIGS. 7 through 10.

At 1610, the UE may determine a payload segmentation threshold. The operations of 1610 may be performed according to the methods described herein. In some examples, aspects of the operations of 1610 may be performed by a CBG organizing component as described with reference to FIGS. 7 through 10.

At 1615, the UE may compare a size of the payload to the payload segmentation threshold. The operations of 1615 may be performed according to the methods described herein. In some examples, aspects of the operations of 1615 may be performed by a CBG organizing component as described with reference to FIGS. 7 through 10.

At 1620, the UE may organize the payload into a code block group that includes one or more code blocks based on the comparing. The operations of 1620 may be performed according to the methods described herein. In some examples, aspects of the operations of 1620 may be performed by a CBG organizing component as described with reference to FIGS. 7 through 10.

At 1625, the UE may map each code block of the code block group to a corresponding uplink shared channel resource unit of an uplink random access transmission occasion shared by the first UE with one or more additional UEs such that the code block group of the first UE is multiplexed with additional code block groups from the additional UEs. The operations of 1625 may be performed according to the methods described herein. In some examples, aspects of the operations of 1625 may be performed by a UE mapping component as described with reference to FIGS. 7 through 10.

At 1630, the UE may transmit, to a base station, the uplink random access message including each uplink shared channel resource unit on which the code block group is organized. The operations of 1630 may be performed according to the methods described herein. In some examples, aspects of the operations of 1630 may be performed by a message transmitter as described with reference to FIGS. 7 through 10.

Figure 17:
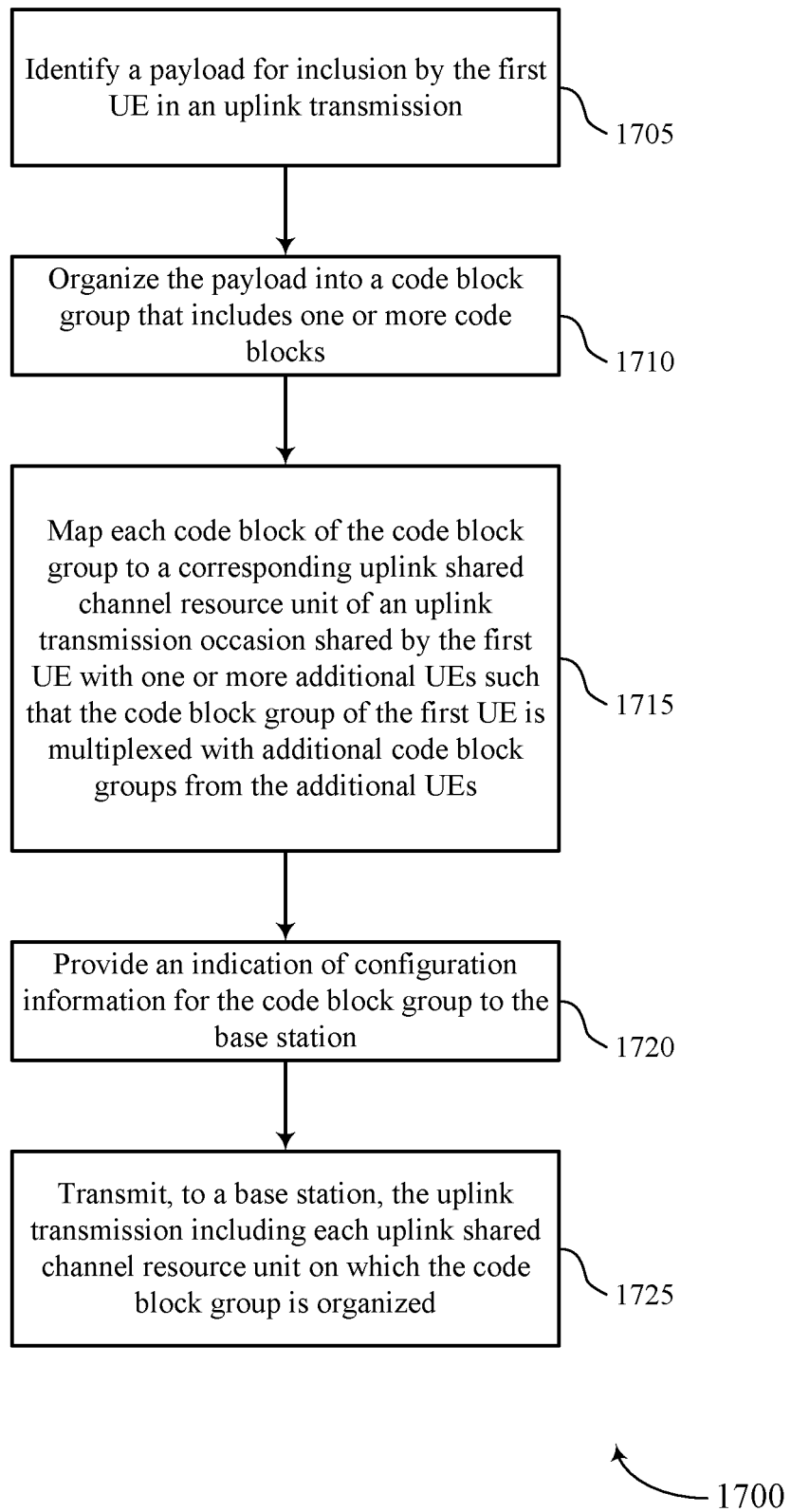

FIG. 17 shows a flowchart illustrating a method 1700 that supports code block group based multiplexing (e.g., in two-step random access procedures or uplink transmissions) in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may identify a payload for inclusion by the first UE in an uplink transmission. The operations of 1705 may be performed according to the methods described herein. In some examples, aspects of the operations of 1705 may be performed by a two-step RACH component as described with reference to FIGS. 7 through 10.

At 1710, the UE may organize the payload into a code block group that includes one or more code blocks. The operations of 1710 may be performed according to the methods described herein. In some examples, aspects of the operations of 1710 may be performed by a CBG organizing component as described with reference to FIGS. 7 through 10.

At 1715, the UE may map each code block of the code block group to a corresponding uplink shared channel resource unit of an uplink transmission occasion shared by the first UE with one or more additional UEs such that the code block group of the first UE is multiplexed with additional code block groups from the additional UEs. The operations of 1715 may be performed according to the methods described herein. In some examples, aspects of the operations of 1715 may be performed by a UE mapping component as described with reference to FIGS. 7 through 10.

At 1720, the UE may provide an indication of configuration information for the code block group to the base station. The operations of 1720 may be performed according to the methods described herein. In some examples, aspects of the operations of 1720 may be performed by a UE configuration information component as described with reference to FIGS. 7 through 10.

At 1725, the UE may transmit, to a base station, the uplink transmission including each uplink shared channel resource unit on which the code block group is organized. The operations of 1725 may be performed according to the methods described herein. In some examples, aspects of the operations of 1725 may be performed by a message transmitter as described with reference to FIGS. 7 through 10.

Figure 18:
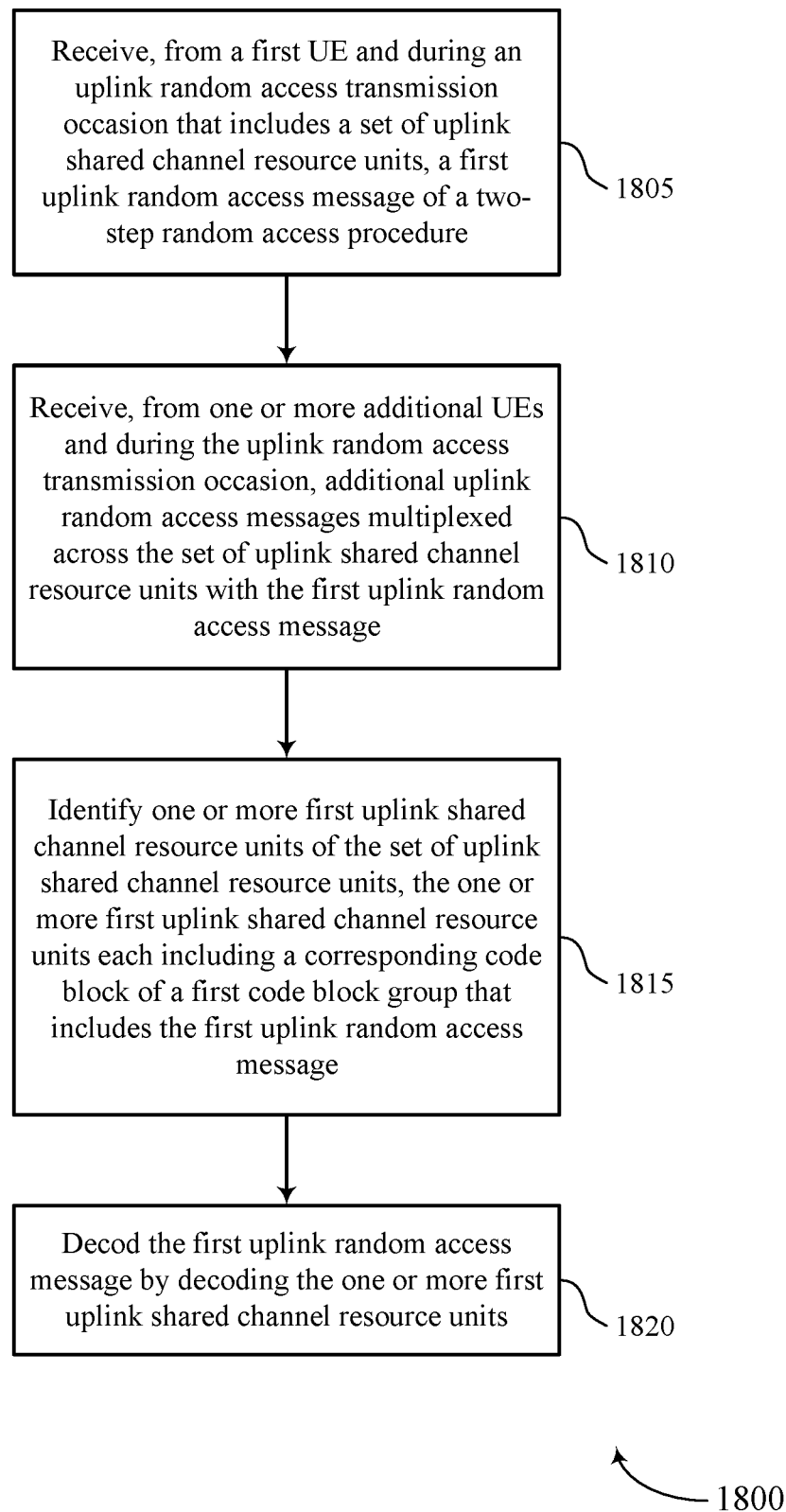

FIG. 18 shows a flowchart illustrating a method 1800 that supports code block group based multiplexing in two-step random access procedures in accordance with aspects of the present disclosure. The operations of method 1800 may be implemented by a base station 105 or its components as described herein. For example, the operations of method 1800 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1805, the base station may receive, from a first UE and during an uplink random access transmission occasion that includes a set of uplink shared channel resource units, a first uplink random access message of a two-step random access procedure. The operations of 1805 may be performed according to the methods described herein. In some examples, aspects of the operations of 1805 may be performed by a message receiver as described with reference to FIGS. 11 through 14.

At 1810, the base station may receive, from one or more additional UEs and during the uplink random access transmission occasion, additional uplink random access messages multiplexed across the set of uplink shared channel resource units with the first uplink random access message. The operations of 1810 may be performed according to the methods described herein. In some examples, aspects of the operations of 1810 may be performed by a message receiver as described with reference to FIGS. 11 through 14.

At 1815, the base station may identify one or more first uplink shared channel resource units of the set of uplink shared channel resource units, the one or more first uplink shared channel resource units each including a corresponding code block of a first code block group that includes the first uplink random access message. The operations of 1815 may be performed according to the methods described herein. In some examples, aspects of the operations of 1815 may be performed by a PRU identifier as described with reference to FIGS. 11 through 14.

At 1820, the base station may decode the first uplink random access message by decoding the one or more first uplink shared channel resource units. The operations of 1820 may be performed according to the methods described herein. In some examples, aspects of the operations of 1820 may be performed by a message decoder as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a first UE, comprising: identifying a payload for inclusion by the first UE in an uplink transmission; organizing the payload into a code block group that includes one or more code blocks; mapping each code block of the code block group to a corresponding uplink shared channel resource unit of an uplink transmission occasion shared by the first UE with one or more additional UEs such that the code block group of the first UE is multiplexed with additional code block groups from the one or more additional UEs; and transmitting, to a base station, the uplink transmission comprising each uplink shared channel resource unit on which the code block group is organized.

Example 2: The method of example 1, further comprising: determining a payload segmentation threshold; comparing a size of the payload to the payload segmentation threshold; and organizing the payload into the code block group based at least in part on the comparing.

Example 3: The method of example 1 or 2, wherein the payload segmentation threshold is based at least in part on a minimum payload size, a maximum payload size, a number of error checking bits attached to the payload, or a combination thereof.

Example 4: The method of any of examples 1 to 3, determining that the size of the payload is smaller than the payload segmentation threshold based at least in part on the comparing; and padding one or more bits to the payload based at least in part on determining that the size of the payload is smaller than the payload segmentation threshold.

Example 5: The method of any of examples 1 to 4, wherein a number of the one or more padded bits is equal to a difference between the payload segmentation threshold and the size of the payload.

Example 6: The method of any of examples 1 to 5, further comprising: determining that the size of the payload is larger than the payload segmentation threshold based at least in part on the comparing; attaching a set of error checking bits to the payload; and segmenting the payload into a set of code blocks comprising each code block of the code block group after attaching the set of error checking bits to the payload and based at least in part on determining that the size of the payload is larger than the payload segmentation threshold.

Example 7: The method of any of examples 1 to 6, further comprising: padding at least one of the set of code blocks with one or more bits based at least in part on the segmenting.

Example 8: The method of any of examples 1 to 7, further comprising: attaching a second set of error checking bits to each of the set of code blocks.

Example 9: The method of any of examples 1 to 8, further comprising: providing an indication of configuration information for the code block group to the base station.

Example 10: The method of any of examples 1 to 9, wherein the configuration information comprises a size of the code block group, an indication of the mapping from each code block to the corresponding uplink shared channel resource unit, or a combination thereof.

Example 11: The method of any of examples 1 to 10, further comprising: multiplexing UCI associated with the configuration information with at least one of the uplink shared channel resource units.

Example 12: The method of any of examples 1 to 11, further comprising: determining to transmit the uplink transmission as part of a contention-free procedure; receiving signaling from the base station indicating a resource mapping; and mapping each code block to the corresponding uplink shared channel resource unit based at least in part on the resource mapping.

Example 13: The method of any of examples 1 to 12, wherein the signaling comprises DCI signaling, RRC signaling, or a combination thereof.

Example 14: The method of any of examples 1 to 13, further comprising: determining to transmit the uplink transmission as part of a contention-based procedure; receiving signaling indicating a set of rules for performing resource mapping for the uplink transmission; and mapping each code block to the corresponding uplink shared channel resource unit based at least in part on the set of rules.

Example 15: The method of any of examples 1 to 14, wherein the set of rules indicate to perform the resource mapping randomly within a configured pool of resources.

Example 16: The method of any of examples 1 to 15, wherein the signaling comprises system information signaling, RRC signaling, or a combination thereof.

Example 17: The method of any of examples 1 to 16, further comprising: selecting a channel coding scheme to encode each code block of the code block group; and encoding each code block of the code block group according to the selected channel coding scheme.

Example 18: The method of any of examples 1 to 17, further comprising: scrambling the code block group at a bit level according to a scrambling identifier, wherein the scrambling identifier is UE-specific and cell-specific, and wherein the scrambling identifier is based at least in part on a preamble resource identifier, a code block group size, a reference signal resource index, an uplink shared channel resource unit index, or a combination thereof.

Example 19: The method of any of examples 1 to 18, further comprising: identifying a minimum payload size and a maximum payload size; and organizing the payload into the code block group based at least in part on the minimum payload size and the maximum payload size.

Example 20: The method of any of examples 1 to 19, wherein the minimum payload size and the maximum payload size are identified based at least in part on a cell identifier, a random access procedure type, a transmission occasion number, or a combination thereof.

Example 21: The method of any of examples 1 to 20, further comprising: multiplexing each corresponding uplink shared channel resource unit with a resource of a DMRS, wherein a configuration of the resource of the DMRS is based at least in part on a number of symbols spanned by the DMRS, a number of resource blocks or sub-PRBs spanned by the DMRS, an index of an antenna port associated with the DMRS, a DMRS sequence, a mapping type, a precoding or beamforming index associated with the DMRS, or a combination thereof.

Example 22: The method of any of examples 1 to 21, wherein the DMRS sequence is spread by an OCC in a time domain, a frequency domain, or a combination thereof.

Example 23: The method of any of examples 1 to 22, wherein a configuration of each uplink shared channel resource unit is based at least in part on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

Example 24: The method of any of examples 1 to 23, wherein the corresponding uplink shared channel resource units comprise a first uplink shared channel resource unit associated with a first code block of the code block group and a second uplink shared channel resource unit associated with a second code block of the code block group.

Example 25: The method of any of examples 1 to 24, wherein the first uplink shared channel resource unit and the second uplink shared channel resource unit overlap in time, frequency, space, or a combination thereof.

Example 26: The method of any of examples 1 to 25, wherein the first uplink shared channel resource unit and the second uplink shared channel resource unit are disjoint in time and frequency.

Example 27: The method of any of examples 1 to 26, wherein the uplink transmission is one of an uplink random access message of a two-step random access procedure or an uplink configured grant transmission.

Example 28: A method for wireless communications at a base station, comprising: receiving, from a first UE and during an uplink transmission occasion that includes a plurality of uplink shared channel resource units, a first uplink transmission; receiving, from one or more additional UEs and during the uplink transmission occasion, additional uplink transmissions multiplexed across the plurality of uplink shared channel resource units with the first uplink transmission; identifying one or more first uplink shared channel resource units of the plurality of uplink shared channel resource units, the one or more first uplink shared channel resource units each including a corresponding code block of a first code block group that comprises the first uplink transmission; and decoding the first uplink transmission by decoding the one or more first uplink shared channel resource units.

Example 29: The method of example 28, further comprising: receiving an indication of configuration information for the first code block group from the first UE.

Example 30: The method of example 28 or 29, wherein the configuration information comprises a size of the first code block group, an indication of the mapping from each code block to the corresponding uplink shared channel resource unit, or a combination thereof.

Example 31: The method of any of examples 28 to 30, further comprising: identifying UCI multiplexed with at least one of the one or more first uplink shared channel resource units; decoding the UCI; and determining the configuration information for the first code block group based at least in part on decoding the UCI.

Example 32: The method of any of examples 28 to 31, further comprising: identifying a set of error checking bits attached to each corresponding code block; and decoding the first uplink transmission based at least in part on the set of error checking bits attached to each corresponding code block.

Example 33: The method of any of examples 28 to 32, further comprising: transmitting signaling to the first UE indicating a resource mapping, wherein the signaling comprises DCI signaling, RRC signaling, or a combination thereof.

Example 34: The method of any of examples 28 to 33, transmitting signaling indicating a set of rules for performing resource mapping.

Example 35: The method of any of examples 28 to 34, wherein the set of rules indicate to perform the resource mapping randomly within a configured pool of resources.

Example 36: The method of any of examples 28 to 35, wherein the signaling comprises system information signaling, RRC signaling, or a combination thereof.

Example 37: The method of any of examples 28 to 36, further comprising: selecting a channel decoding scheme to decode each corresponding code block; and decoding each corresponding code block according to the selected channel decoding scheme.

Example 38: The method of any of examples 28 to 37, further comprising: descrambling the first code block group at a bit level according to a scrambling identifier.

Example 39: The method of any of examples 28 to 38, wherein the scrambling identifier is UE-specific and cell-specific.

Example 40: The method of any of examples 28 to 39, wherein the scrambling identifier is based at least in part on a preamble resource identifier, a size of the first code block group, a reference signal resource index, an uplink shared channel resource unit index, or a combination thereof.

Example 41: The method of any of examples 28 to 40, further comprising: identifying a minimum payload size and a maximum payload size; and decoding the first uplink transmission based at least in part on the minimum payload size and the maximum payload size.

Example 42: The method of any of examples 28 to 41, wherein the minimum payload size and the maximum payload size are identified based at least in part on a cell identifier, a random access procedure type, a transmission occasion number, or a combination thereof.

Example 43: The method of any of examples 28 to 42, further comprising: identifying, for each of the one or more first uplink shared channel resource units, a resource of a reference signal; and decoding the first uplink transmission based at least in part on identifying the resource of the reference signal for each of the one or more first uplink shared channel resource units.

Example 44: The method of any of examples 28 to 43, wherein the reference signal is DMRS.

Example 45: The method of any of examples 28 to 44, wherein a configuration of the resource of the reference signal is based at least in part on a number of symbols spanned by the DMRS, a number of resource blocks or sub-PRBs spanned by the DMRS, an index of an antenna port associated with the DMRS, a DMRS sequence, a mapping type, a precoding or beamforming index associated with the DMRS, or a combination thereof.

Example 46: The method of any of examples 28 to 45, wherein the DMRS sequence is spread by an OCC in a time domain, a frequency domain, a combination thereof.

Example 47: The method of any of examples 28 to 46, wherein a configuration of each of the one or more first uplink shared channel resource units is based at least in part on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

Example 48: The method of any of examples 28 to 47, wherein the corresponding uplink shared channel resource is a PUSCH resource.

Example 49: The method of any of examples 28 to 48, wherein a size of the first code block group is based at least in part on a range of a size of a payload, a random access procedure type, a system bandwidth, system loading, a transmission occasion number, or a combination thereof.

Example 50: The method of any of examples 28 to 49, wherein the one or more first uplink shared channel resource units comprise a first uplink shared channel resource unit associated with a first code block of the first code block group and a second uplink shared channel resource unit associated with a second code block of the first code block group.

Example 51: The method of any of examples 28 to 50, wherein the first uplink shared channel resource unit and the second uplink shared channel resource unit overlap in time, frequency, space, or a combination thereof.

Example 52: The method of any of examples 28 to 51, wherein the first uplink shared channel resource unit and the second uplink shared channel resource unit overlap in time and are contiguous in frequency.

Example 53: The method of any of examples 28 to 52, wherein the first uplink shared channel resource unit and the second uplink shared channel resource unit overlap in frequency and are contiguous in time.

Example 54: The method of any of examples 28 to 53, wherein the first uplink shared channel resource unit and the second uplink shared channel resource unit are disjoint in time and frequency.

Example 55: A method for wireless communication at a first UE, comprising: identifying a payload for inclusion by the first UE in an uplink random access message of a two-step random access procedure; organizing the payload into a code block group that includes one or more code blocks; mapping each code block of the code block group to a corresponding uplink shared channel resource unit of an uplink random access transmission occasion shared by the first UE with one or more additional UEs such that the code block group of the first UE is multiplexed with additional code block groups from the one or more additional UEs; and transmitting, to a base station, the uplink random access message comprising each uplink shared channel resource unit on which the code block group is organized.

Example 56: The method of example 55, further comprising: determining a payload segmentation threshold; comparing a size of the payload to the payload segmentation threshold; and organizing the payload into the code block group based at least in part on the comparing.

Example 57: The method of example 55 or 56, wherein the payload segmentation threshold is based at least in part on a minimum payload size, a maximum payload size, a number of error checking bits attached to the payload, or a combination thereof.

Example 58: The method of any of examples 55 to 57, further comprising: determining that the size of the payload is smaller than the payload segmentation threshold based at least in part on the comparing; and padding one or more bits to the payload based at least in part on determining that the size of the payload is smaller than the payload segmentation threshold.

Example 59: The method of any of examples 55 to 58, wherein a number of the one or more padded bits is equal to a difference between the payload segmentation threshold and the size of the payload.

Example 60: The method of any of examples 55 to 59, further comprising: determining that the size of the payload is larger than the payload segmentation threshold based at least in part on the comparing; attaching a set of error checking bits to the payload; and segmenting the payload into a set of code blocks comprising each code block of the code block group after attaching the set of error checking bits to the payload and based at least in part on determining that the size of the payload is larger than the payload segmentation threshold.

Example 61: The method of any of examples 55 to 60, further comprising: padding at least one of the set of code blocks with one or more bits based at least in part on the segmenting.

Example 62: The method of any of examples 55 to 61, further comprising: attaching a second set of error checking bits to each of the set of code blocks.

Example 63: The method of any of examples 55 to 62, further comprising: providing an indication of configuration information for the code block group to the base station.

Example 64: The method of any of examples 55 to 63, wherein the configuration information comprises a size of the code block group, an indication of the mapping from each code block to the corresponding uplink shared channel resource unit, or a combination thereof.

Example 65: The method of any of examples 55 to 64, further comprising: identifying a preamble associated with the uplink random access message; determining a preamble resource identifier for the preamble based at least in part on the configuration information; and transmitting the preamble with the preamble resource identifier.

Example 66: The method of any of examples 55 to 65, further comprising: identifying a set of preamble sequence indices and a set of random access occasion indices; partitioning the set of preamble sequence indices into a plurality of subsets of preamble sequence indices and the set of random access occasion indices into a plurality of subsets of random access occasion indices based at least in part on the configuration information; and determining the preamble resource identifier based at least in part on the partitioning.

Example 67: The method of any of examples 55 to 66, further comprising: multiplexing UCI associated with the configuration information with at least one of the uplink shared channel resource units.

Example 68: The method of any of examples 55 to 67, further comprising: determining to transmit the uplink random access message as part of a contention-free random access procedure; receiving signaling from the base station indicating a resource mapping; and mapping each code block to the corresponding uplink shared channel resource unit based at least in part on the resource mapping.

Example 69: The method of any of examples 55 to 68, wherein the signaling comprises DCI signaling, RRC signaling, or a combination thereof.

Example 70: The method of any of examples 55 to 69, further comprising: determining to transmit the uplink random access message as part of a contention-based random access procedure; receiving signaling indicating a set of rules for performing resource mapping for the uplink random access message; and mapping each code block to the corresponding uplink shared channel resource unit based at least in part on the set of rules.

Example 71: The method of any of examples 55 to 70, wherein the set of rules indicate to perform the resource mapping randomly within a configured pool of resources.

Example 72: The method of any of examples 55 to 71, wherein the signaling comprises system information signaling, RRC signaling, or a combination thereof.

Example 73: The method of any of examples 55 to 72, further comprising: selecting a channel coding scheme to encode each code block of the code block group; and encoding each code block of the code block group according to the selected channel coding scheme.

Example 74: The method of any of examples 55 to 73, further comprising: scrambling the code block group at a bit level according to a scrambling identifier.

Example 75: The method of any of examples 55 to 74, wherein the scrambling identifier is UE-specific and cell-specific.

Example 76: The method of any of examples 55 to 75, wherein the scrambling identifier is based at least in part on a preamble resource identifier, a code block group size, a reference signal resource index, an uplink shared channel resource unit index, or a combination thereof.

Example 77: The method of any of examples 55 to 76, further comprising: identifying a minimum payload size and a maximum payload size; and organizing the payload into the code block group based at least in part on the minimum payload size and the maximum payload size.

Example 78: The method of any of examples 55 to 77, wherein the minimum payload size and the maximum payload size are identified based at least in part on a cell identifier, a random access procedure type, a transmission occasion number, or a combination thereof.

Example 79: The method of any of examples 55 to 78, further comprising: multiplexing each corresponding uplink shared channel resource unit with a resource of a reference signal.

Example 80: The method of any of examples 55 to 79, wherein the reference signal is a DMRS.

Example 81: The method of any of examples 55 to 80, wherein a configuration of the resource of the reference signal is based at least in part on a number of symbols spanned by the DMRS, a number of resource blocks or sub-PRBs spanned by the DMRS, an index of an antenna port associated with the DMRS, a DMRS sequence, a mapping type, a precoding or beamforming index associated with the DMRS, or a combination thereof.

Example 82: The method of any of examples 55 to 81, wherein the DMRS sequence is spread by an OCC in a time domain, a frequency domain, or a combination thereof.

Example 83: The method of any of examples 55 to 82, wherein a configuration of each uplink shared channel resource unit is based at least in part on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

Example 84: The method of any of examples 55 to 83, wherein the corresponding uplink shared channel resource is a PUSCH resource.

Example 85: The method of any of examples 55 to 84, wherein a size of the code block group is based at least in part on a range of a size of the payload, a random access procedure type, a system bandwidth, system loading, a transmission occasion number, or a combination thereof.

Example 86: The method of any of examples 55 to 85, wherein the corresponding uplink shared channel resource units comprise a first uplink shared channel resource unit associated with a first code block of the code block group and a second uplink shared channel resource unit associated with a second code block of the code block group.

Example 87: The method of any of examples 55 to 86, wherein the first uplink shared channel resource unit and the second uplink shared channel resource unit overlap in time, frequency, space, or a combination thereof.

Example 88: The method of any of examples 55 to 87, wherein the first uplink shared channel resource unit and the second uplink shared channel resource unit overlap in time and are contiguous in frequency.

Example 89: The method of any of examples 55 to 88, wherein the first uplink shared channel resource unit and the second uplink shared channel resource unit overlap in frequency and are contiguous in time.

Example 90: The method of any of examples 55 to 89, wherein the first uplink shared channel resource unit and the second uplink shared channel resource unit are disjoint in time and frequency.

Example 91: A method for wireless communications at a base station, comprising: receiving, from a first UE and during an uplink random access transmission occasion that includes a plurality of uplink shared channel resource units, a first uplink random access message of a two-step random access procedure; receiving, from one or more additional UEs and during the uplink random access transmission occasion, additional uplink random access messages multiplexed across the plurality of uplink shared channel resource units with the first uplink random access message; identifying one or more first uplink shared channel resource units of the plurality of uplink shared channel resource units, the one or more first uplink shared channel resource units each including a corresponding code block of a first code block group that comprises the first uplink random access message; and decoding the first uplink random access message by decoding the one or more first uplink shared channel resource units.

Example 92: The method of example 91, further comprising: receiving an indication of configuration information for the first code block group from the first UE.

Example 93: The method of example 91 or 92, wherein the configuration information comprises a size of the first code block group, an indication of the mapping from each code block to the corresponding uplink shared channel resource unit, or a combination thereof.

Example 94: The method of any of examples 91 to 93, further comprising: receiving a preamble associated with the first uplink random access message; determining a preamble resource identifier for the preamble; and identifying the configuration information for the first code block group based at least in part on the preamble resource identifier.

Example 95: The method of any of examples 91 to 94, further comprising: identifying a set of preamble sequence indices and a set of random access occasion indices; partitioning the set of preamble sequence indices into a plurality of subsets of preamble sequence indices and the set of random access occasion indices into a plurality of subsets of random access occasion indices based at least in part on the configuration information; and identifying the configuration information based at least in part on the partitioning.

Example 96: The method of any of examples 91 to 95, further comprising: identifying UCI multiplexed with at least one of the one or more first uplink shared channel resource units; decoding the UCI; and determining the configuration information for the first code block group based at least in part on decoding the UCI.

Example 97: The method of any of examples 91 to 96, further comprising: identifying a set of error checking bits attached to each corresponding code block; and decoding the first uplink random access message based at least in part on the set of error checking bits attached to each corresponding code block.

Example 98: The method of any of examples 91 to 97, further comprising: organizing each corresponding code block together into a payload; identifying a set of error checking bits attached to the payload; and decoding the first uplink random access message based at least in part on the set of error checking bits attached to the payload.

Example 99: The method of any of examples 91 to 98, further comprising: transmitting signaling to the first UE indicating a resource mapping; and receiving the first uplink random access message as part of a contention free random access procedure based at least in part on transmitting the signaling indicating the resource mapping.

Example 100: The method of any of examples 91 to 99, wherein the signaling comprises DCI signaling, RRC signaling, or a combination thereof.

Example 101: The method of any of examples 91 or 100, further comprising: transmitting signaling indicating a set of rules for performing resource mapping; and receiving the first uplink random access message from the first UE as part of a contention-based random access procedure based at least in part on transmitting the signaling indicating the set of rules.

Example 102: The method of any of examples 91 or 101, wherein the set of rules indicate to perform the resource mapping randomly within a configured pool of resources.

Example 103: The method of any of examples 91 or 102, wherein the signaling comprises system information signaling, RRC signaling, or a combination thereof.

Example 104: The method of any of examples 91 or 103, further comprising: selecting a channel decoding scheme to decode each corresponding code block; and decoding each corresponding code block according to the selected channel decoding scheme.

Example 105: The method of any of examples 91 or 104, further comprising: descrambling the first code block group at a bit level according to a scrambling identifier.

Example 106: The method of any of examples 91 or 105, wherein the scrambling identifier is UE-specific and cell-specific.

Example 107: The method of any of examples 91 or 106, wherein the scrambling identifier is based at least in part on a preamble resource identifier, a size of the first code block group, a reference signal resource index, an uplink shared channel resource unit index, or a combination thereof.

Example 108: The method of any of examples 91 or 107, further comprising: identifying a minimum payload size and a maximum payload size; and decoding the first uplink random access message based at least in part on the minimum payload size and the maximum payload size.

Example 109: The method of any of examples 91 or 108, wherein the minimum payload size and the maximum payload size are identified based at least in part on a cell identifier, a random access procedure type, a transmission occasion number, or a combination thereof.

Example 110: The method of any of examples 91 or 109, further comprising: identifying, for each of the one or more first uplink shared channel resource units, a resource of a reference signal; and decoding the first uplink random access message based at least in part on identifying the resource of the reference signal for each of the one or more first uplink shared channel resource units.

Example 111: The method of any of examples 91 or 110, wherein the reference signal is a DMRS.

Example 112: The method of any of examples 91 or 111, wherein a configuration of the resource of the reference signal is based at least in part on a number of symbols spanned by the DMRS, a number of resource blocks or sub-PRBs spanned by the DMRS, an index of an antenna port associated with the DMRS, a DMRS sequence, a mapping type, a precoding or beamforming index associated with the DMRS, or a combination thereof.

Example 113: The method of any of examples 91 or 112, wherein the DMRS sequence is spread by an OCC in a time domain, a frequency domain, a combination thereof.

Example 114: The method of any of examples 91 or 113, wherein a configuration of each of the one or more first uplink shared channel resource units is based at least in part on a number of symbols spanned by a corresponding uplink shared channel resource, a number of resource blocks or sub-PRBs spanned by the corresponding uplink shared channel resource, a precoding or beamforming index associated with the corresponding uplink shared channel resource, a UE-specific multiple access signature associated with the corresponding uplink shared channel resource, a cell-specific multiple access signature associated with the corresponding uplink shared channel resource, or a combination thereof.

Example 115: The method of any of examples 91 or 114, wherein the corresponding uplink shared channel resource is a PUSCH resource.

Example 116: The method of any of examples 91 or 115, wherein a size of the first code block group is based at least in part on a range of a size of a payload, a random access procedure type, a system bandwidth, system loading, a transmission occasion number, or a combination thereof.

Example 117: The method of any of examples 91 or 116, wherein the one or more first uplink shared channel resource units comprise a first uplink shared channel resource unit associated with a first code block of the first code block group and a second uplink shared channel resource unit associated with a second code block of the first code block group.

Example 118: The method of any of examples 91 or 117, wherein the first uplink shared channel resource unit and the second uplink shared channel resource unit overlap in time, frequency, space, or a combination thereof.

Example 119: The method of any of examples 91 or 118, wherein the first uplink shared channel resource unit and the second uplink shared channel resource unit overlap in time and are contiguous in frequency.

Example 120: The method of any of examples 91 or 119, wherein the first uplink shared channel resource unit and the second uplink shared channel resource unit overlap in frequency and are contiguous in time.

Example 121: The method of any of examples 91 or 120, wherein the first uplink shared channel resource unit and the second uplink shared channel resource unit are disjoint in time and frequency.

Example 122: An apparatus for wireless communications comprising a processor; memory coupled with the processor; and instructions stored in the memory and executable by the processor to cause the apparatus to perform a method of any of examples 1 to 27.

Example 123: An apparatus for wireless communications comprising a processor; memory coupled with the processor; and instructions stored in the memory and executable by the processor to cause the apparatus to perform a method of any of examples 28 to 54.

Example 124: An apparatus for wireless communications comprising a processor; memory coupled with the processor; and instructions stored in the memory and executable by the processor to cause the apparatus to perform a method of any of examples 55 to 90.

Example 125: An apparatus for wireless communications comprising a processor; memory coupled with the processor; and instructions stored in the memory and executable by the processor to cause the apparatus to perform a method of any of examples 91 to 121.

Example 126: An apparatus comprising at least one means for performing a method of any of examples 1 to 27.

Example 127: An apparatus comprising at least one means for performing a method of any of examples 28 to 54.

Example 128: An apparatus comprising at least one means for performing a method of any of examples 55 to 90.

Example 129: An apparatus comprising at least one means for performing a method of any of examples 91 to 121.

Example 130: A non-transitory computer-readable medium storing code for wireless communications, the code comprising instructions executable by a processor to perform a method of any of examples 1 to 27.

Example 131: A non-transitory computer-readable medium storing code for wireless communications, the code comprising instructions executable by a processor to perform a method of any of examples 28 to 54.

Example 132: A non-transitory computer-readable medium storing code for wireless communications, the code comprising instructions executable by a processor to perform a method of any of examples 55 to 90.

Example 133: A non-transitory computer-readable medium storing code for wireless communications, the code comprising instructions executable by a processor to perform a method of any of examples 91 to 121.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first user equipment (UE), comprising:
    one or more memories storing processor-executable code; and
    one or more processors coupled with the one or more memories and individually or collectively operable to execute the code to cause the first UE to:
        organize a payload into a code block group that includes one or more code blocks;
        scramble the code block group at a bit level according to a scrambling identifier;
        map the code block group to a corresponding one or more uplink shared channel resource units of an uplink transmission occasion shared by the first UE with one or more additional UEs such that the code block group of the first UE is multiplexed with additional code block groups from the one or more additional UEs;
        provide an indication of configuration information for the code block group to the network entity; and
        transmit, to a network entity and in accordance with a contention-based random access procedure, an uplink transmission comprising each uplink shared channel resource unit on which the code block group is organized.

2. The first UE of claim 1, wherein:
    the scrambling identifier is UE-specific and cell-specific.

3. The first UE of claim 1, wherein the scrambling identifier is based at least in part on a preamble resource identifier, a code block group size, a reference signal resource index, an uplink shared channel resource unit index, or a combination thereof.

4. The first UE of claim 1, wherein the configuration information comprises a size of the code block group, an indication of the mapping from each code block to the corresponding uplink shared channel resource unit, or a combination thereof.

5. The first UE of claim 1, wherein the one or more processors are individually or collectively further operable to execute the code to cause the first UE to:
    identify a preamble associated with the uplink transmission;
    determine a preamble resource identifier for the preamble based at least in part on the configuration information; and
    transmit the preamble with the preamble resource identifier.

6. The first UE of claim 5, wherein the one or more processors are individually or collectively further operable to execute the code to cause the first UE to:
identify a set of preamble sequence indices and a set of random access occasion indices;
partition the set of preamble sequence indices into a plurality of subsets of preamble sequence indices and the set of random access occasion indices into a plurality of subsets of random access occasion indices based at least in part on the configuration information; and
determine the preamble resource identifier based at least in part on the partitioning.

7. The first UE of claim 1, wherein the one or more processors are individually or collectively further operable to execute the code to cause the first UE to:
determine to transmit the uplink transmission as part of the contention-based random access procedure;
receive signaling indicating a set of rules for performing resource mapping for the uplink transmission; and
map each code block to the corresponding uplink shared channel resource unit based at least in part on the set of rules.

8. The first UE of claim 7, wherein the set of rules indicate to perform the resource mapping randomly within a configured pool of resources.

9. The first UE of claim 7, wherein the signaling comprises system information (SI) signaling, radio resource control (RRC) signaling, or a combination thereof.

10. The first UE of claim 1, wherein the one or more processors are individually or collectively further operable to execute the code to cause the first UE to:
multiplex each corresponding uplink shared channel resource unit with a resource of a reference signal.

11. The first UE of claim 10, wherein the reference signal is a demodulation reference signal (DMRS).

12. The first UE of claim 11, wherein a configuration of the resource of the reference signal is based at least in part on a number of symbols spanned by the DMRS, a number of resource blocks or sub-physical-resource-blocks (sub-PRBs) spanned by the DMRS, an index of an antenna port associated with the DMRS, a DMRS sequence, a mapping type, a precoding or beamforming index associated with the DMRS, or a combination thereof.

13. The first UE of claim 12, wherein the DMRS sequence is spread by an orthogonal cover code (OCC) in a time domain, a frequency domain, or a combination thereof.

14. A method for wireless communication at a first user equipment (UE), comprising:
organizing a payload into a code block group that includes one or more code blocks;
scrambling the code block group at a bit level according to a scrambling identifier;
mapping the code block group to a corresponding one or more uplink shared channel resource units of an uplink transmission occasion shared by the first UE with one or more additional UEs such that the code block group of the first UE is multiplexed with additional code block groups from the one or more additional UEs;
providing an indication of configuration information for the code block group to the network entity; and
transmitting, to a network entity and in accordance with a contention-based random access procedure, an uplink transmission comprising each uplink shared channel resource unit on which the code block group is organized.

15. The method of claim 14, wherein the scrambling identifier is UE-specific and cell-specific.

16. The method of claim 14, wherein the scrambling identifier is based at least in part on a preamble resource identifier, a code block group size, a reference signal resource index, an uplink shared channel resource unit index, or a combination thereof.

17. The method of claim 14, wherein the configuration information comprises a size of the code block group, an indication of the mapping from each code block to the corresponding uplink shared channel resource unit, or a combination thereof.

18. The method of claim 14, further comprising:
identifying a preamble associated with the uplink transmission;
determining a preamble resource identifier for the preamble based at least in part on the configuration information; and
transmitting the preamble with the preamble resource identifier.

19. The method of claim 18, further comprising:
identifying a set of preamble sequence indices and a set of random access occasion indices;
partitioning the set of preamble sequence indices into a plurality of subsets of preamble sequence indices and the set of random access occasion indices into a plurality of subsets of random access occasion indices based at least in part on the configuration information; and
determining the preamble resource identifier based at least in part on the partitioning.

20. The method of claim 14, further comprising:
determining to transmit the uplink transmission as part of the contention-based random access procedure;
receiving signaling indicating a set of rules for performing resource mapping for the uplink transmission; and
mapping each code block to the corresponding uplink shared channel resource unit based at least in part on the set of rules.

21. The method of claim 20, wherein the set of rules indicate to perform the resource mapping randomly within a configured pool of resources.

22. The method of claim 20, wherein the signaling comprises system information (SI) signaling, radio resource control (RRC) signaling, or a combination thereof.

23. The method of claim 14, further comprising:
multiplexing each corresponding uplink shared channel resource unit with a resource of a reference signal.

24. The method of claim 23, wherein the reference signal is a demodulation reference signal (DMRS).

25. The method of claim 24, wherein a configuration of the resource of the reference signal is based at least in part on a number of symbols spanned by the DMRS, a number of resource blocks or sub-physical-resource-blocks (sub-PRBs) spanned by the DMRS, an index of an antenna port associated with the DMRS, a DMRS sequence, a mapping type, a precoding or beamforming index associated with the DMRS, or a combination thereof.

26. The method of claim 25, wherein the DMRS sequence is spread by an orthogonal cover code (OCC) in a time domain, a frequency domain, or a combination thereof.

27. A first user equipment (UE) for wireless communication, comprising:
means for organizing a payload into a code block group that includes one or more code blocks;
means for scrambling the code block group at a bit level according to a scrambling identifier;

means for mapping the code block group to a corresponding one or more uplink shared channel resource units of an uplink transmission occasion shared by the first UE with one or more additional UEs such that the code block group of the first UE is multiplexed with additional code block groups from the one or more additional UEs;

providing an indication of configuration information for the code block group to the network entity; and means for transmitting, to a network entity and in accordance with a contention-based random access procedure, an uplink transmission comprising each uplink shared channel resource unit on which the code block group is organized.

28. A non-transitory computer-readable medium storing code for wireless communication, the code comprising instructions executable by one or more processors to:

organize a payload into a code block group that includes one or more code blocks;

scramble the code block group at a bit level according to a scrambling identifier;

map the code block group to a corresponding one or more uplink shared channel resource units of an uplink transmission occasion shared by a first UE with one or more additional UEs such that the code block group of the first UE is multiplexed with additional code block groups from the one or more additional UEs; and providing an indication of configuration information for the code block group to the network entity;

transmit, to a network entity and in accordance with a contention-based random access procedure, an uplink transmission comprising each uplink shared channel resource unit on which the code block group is organized.

* * * * *